US011900059B2

(12) United States Patent
Bulu

(10) Patent No.: US 11,900,059 B2
(45) Date of Patent: Feb. 13, 2024

(54) METHOD, APPARATUS AND COMPUTER PROGRAM PRODUCT FOR GENERATING ENCOUNTER VECTORS AND CLIENT VECTORS USING NATURAL LANGUAGE PROCESSING MODELS

(71) Applicant: UnitedHealth Group Incorporated, Minnetonka, MN (US)

(72) Inventor: Irfan Bulu, Sartell, MN (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 294 days.

(21) Appl. No.: 17/304,908

(22) Filed: Jun. 28, 2021

(65) Prior Publication Data

US 2022/0414329 A1 Dec. 29, 2022

(51) Int. Cl.
*G06F 40/00* (2020.01)
*G06F 40/279* (2020.01)
*G06F 16/903* (2019.01)
*G06N 5/02* (2023.01)
*G06N 20/00* (2019.01)

(52) U.S. Cl.
CPC ...... *G06F 40/279* (2020.01); *G06F 16/90335* (2019.01); *G06N 5/02* (2013.01); *G06N 20/00* (2019.01)

(58) Field of Classification Search
CPC ........... G06F 40/20; G06F 40/30; G06F 40/35
See application file for complete search history.

(56) References Cited

U.S. PATENT DOCUMENTS

| 9,691,096 | B1* | 6/2017 | Dai ................... G06Q 30/0631 |
| 2014/0025376 | A1* | 1/2014 | Wasserblat ............. G10L 25/51 |
| | | | 704/238 |
| 2018/0091654 | A1* | 3/2018 | Miller ...................... G06F 7/02 |
| 2020/0027531 | A1 | 1/2020 | White et al. |
| 2020/0065831 | A1* | 2/2020 | Shachaf ............. H04M 3/5166 |
| 2020/0152333 | A1 | 5/2020 | Tomasev et al. |
| 2020/0327404 | A1 | 10/2020 | Miotto et al. |

(Continued)

FOREIGN PATENT DOCUMENTS

WO 2020/211275 A1 10/2020

OTHER PUBLICATIONS

Alammar, Jay. "The Illustrated Transformer," Github, Jun. 27, 2018, pp. 1-23, (article, online), [Retrieved from the Internet Sep. 17, 2021] <http://jalammar.github.io/illustrated-transformer/>.

(Continued)

*Primary Examiner* — Daniel Abebe
(74) *Attorney, Agent, or Firm* — ALSTON & BIRD LLP

(57) ABSTRACT

Methods, apparatuses, systems, computing devices, computing entities, and/or the like are provided. An example method may include retrieving one or more record data elements associated with a client identifier; generating one or more encounter vectors based at least in part on the one or more record data elements; generating a client vector based at least in part on the one or more encounter vectors and a first natural language processing model; generating a prediction data element based at least in part on the client vector and a machine learning model; and perform at least one data operation based at least in part on the prediction data element.

20 Claims, 18 Drawing Sheets

(56) References Cited

U.S. PATENT DOCUMENTS

| | | | | |
|---|---|---|---|---|
| 2022/0084371 A1* | 3/2022 | Semichev | ............... | H04L 63/08 |
| 2023/0153280 A1* | 5/2023 | Rout | ..................... | G06F 16/215 |
| | | | | 706/25 |

OTHER PUBLICATIONS

Chen, Yen-Pin et al. "Disease Concept-Embedding Based On The Self-Supervised Method For Medical Information Extraction From Electronic Health Records and Diseases Retrieval: Algorithm Development and Validation Study," Journal of Medical Internet Research, vol. 23, No. 1:e25113, Jan. 27, 2021, (14 pages), DOI: 10.2196/25113, PMID: 33502324, PMCID: 7875703.

Choi, Edward et al. "Learning The Graphical Structure Of Electronic Health Records With Graph Convolutional Transformer," The Thirty-Fourth AAAI Conference On Artificial Intelligence (AAAI-20), vol. 34, No. 1, Apr. 3, 2020, pp. 606-613.

Corbin, Conor K. et al. "Embedding Methods For EHR Data and The Utility Of Clinical Text," Stanford University, [publication date unavailable], pp. 1-9, https://web.stanford.edu/class/archive/cs/cs224n/cs224n.1194/reports/custom/15846252.pdf.

Darabi, Sajad et al. "TAPER: Time-Aware Patient EHR Representation," arXiv Preprint arXiv:1908.03971v4 [cs.LG], May 3, 2020, pp. 1-8.

Darabi, Sajad et al. "Unsupervised Representation For EHR Signals and Codes As Patient Status Vector," arXiv preprint arXiv:1910.01803, Oct. 4, 2019, pp. 1-10.

Li, Yikuan et al. "BEHRT: Transformer For Electronic Health Records," Scientific Reports, vol. 10, No. 7155, Apr. 28, 2020, (12 pages), DOI: 10.1038/s41598-020-62922-y.

Meng, Yiwen et al. "Bidirectional Representation Learning From Transformers Using Multimodal Electronic Health Record Data To Predict Depression," IEEE Journal of Biomedical and Health Informatics, Mar. 4, 2021, (9 pages).

Rasmy, Laila et al. "Med-BERT: Pre-Trained Contextualized Embeddings On Large-Scale Structured Electronic Health Records For Disease Prediction," arXiv Preprint arXiv:2005.12833 [cs.CL] (Year: 2005), pp. 1-23.

Shang, Junyuan et al. "Pre-Training of Graph Augmented Transformers For Medication Recommendation," arXiv Preprint, arXiv:1906.00346v2 [cs:AI], Nov. 27, 2019, (8 pages), https://arxiv.org/pdf/1906.00346.pdf.

Xu, Dongfang et al. "Unified Medical Language System Resources Improve Sieve-Based Generation and Bidirectional Encoder Representations From Transformers (BERT)-Based Ranking For Concept Normalization," Journal of the American Medical Informatics Association, vol. 27, Issue 10, Jul. 27, 2020, pp. 1510-1519, DOI: 10.1093/jamia/ocaa080.

Zhu, Weicheng et al. "Variationally Regularized Graph-Based Representation Learning For Electronic Health Records," In Proceedings of the Conference on Health, Inference, and Learning, Apr. 8, 2021, pp. 1-13.

* cited by examiner

METHOD, APPARATUS AND COMPUTER PROGRAM PRODUCT FOR GENERATING ENCOUNTER VECTORS AND CLIENT VECTORS USING NATURAL LANGUAGE PROCESSING MODELS

TECHNOLOGICAL FIELD

Embodiments of the present disclosure relate generally to improving computer and data system functionalities, such as, but not limited to, functionalities of data analytics and prediction systems. For example, various embodiments of the present disclosure may programmatically generate one or more encounter vectors based at least in part on one or more record data elements, generate one or more client vectors based at least in part on the one or more encounter vectors, and generate a prediction data element based at least in part on the one or more client vectors.

BACKGROUND

Natural language processing and machine learning have great potential for providing various technical advancement and technical benefits not only in the field of computer science, but also in other associated technical fields and applications. Applicant has identified many technical challenges, deficiencies and problems associated with natural language processing and machine learning systems and methods.

BRIEF SUMMARY

In general, embodiments of the present disclosure provide methods, apparatuses, systems, computing devices, computing entities, and/or the like.

In accordance with various embodiments of the present disclosure, an apparatus is provided. The apparatus may comprise at least one processor and at least one non-transitory memory comprising a computer program code. The at least one non-transitory memory and the computer program code may be configured to, with the at least one processor, cause the apparatus to retrieve one or more record data elements associated with a client identifier, wherein each of the one or more record data elements is associated with an encounter identifier of one or more encounter identifiers, wherein the one or more encounter identifiers are associated with the client identifier; generate one or more encounter vectors based at least in part on the one or more record data elements, wherein the one or more encounter vectors are associated with the one or more encounter identifiers; generate a client vector based at least in part on the one or more encounter vectors, wherein the client vector is associated with the client identifier; generate a prediction data element based at least in part on the client vector and a machine learning model, wherein the prediction data element is associated with the client identifier; and perform at least one data operation based at least in part on the prediction data element.

In some embodiments, a first natural language processing model is associated with at least one of the one or more encounter vectors or the client vector. For example, the first natural language processing model may be implemented to generate the one or more encounter vectors. Additionally, or alternatively, the first natural language processing model may be implemented to generate the client vector.

In some embodiments, when generating the one or more encounter vectors, the at least one non-transitory memory and the computer program code are configured to, with the at least one processor, cause the apparatus to: associate the one or more record data elements with one or more record category identifiers; associate the one or more record data elements with one or more record text descriptors; and generate one or more record text vectors based at least in part on the one or more record text descriptors and a second natural language processing model.

In some embodiments, the at least one non-transitory memory and the computer program code are configured to, with the at least one processor, cause the apparatus to generate one or more record category vectors associated with the one or more record category identifiers. In some embodiments, when generating a record category vector of the one or more record category vectors that is associated with a record category identifier of the one or more record category identifiers, the at least one non-transitory memory and the computer program code are configured to, with the at least one processor, cause the apparatus to: identify at least one record text vector, from the one or more record text vectors, being associated with the record category identifier of the one or more record category identifiers; and generate the record category vector associated with the record category identifier based at least in part on the at least one record text vector and a third natural language processing model.

In some embodiments, the at least one non-transitory memory and the computer program code are configured to, with the at least one processor, cause the apparatus to: identify at least one record category identifier, from the one or more record category identifiers, being associated with an encounter identifier of the one or more encounter identifiers based at least in part on the one or more record data elements; identify at least one record category vector, from the one or more record category vectors, being associated with the at least one record category identifier; and generate at least one encounter vector associated with the encounter identifier based at least in part on the at least one record category vector.

In some embodiments, the at least one non-transitory memory and the computer program code are configured to, with the at least one processor, cause the apparatus to: determine whether more than one record category vector is associated with the encounter identifier; in response to determining that only one record category vector is associated with the at least one record category identifier, assign the only one record category vector as the encounter vector; and in response to determining that a plurality of record category vectors are associated with the at least one record category identifier, generate the at least one encounter vector based at least in part on the plurality of record category vectors.

In some embodiments, when generating the at least one encounter vector based at least in part on the plurality of record category vectors, the at least one non-transitory memory and the computer program code are configured to, with the at least one processor, cause the apparatus to combine the plurality of record category vectors based at least in part on one or more of summation, multiplication, or one or more artificial neural networks.

In some embodiments, at least one of the first natural language processing model, the second natural language processing model, or the third natural language processing model is a transformer. In some embodiments, at least one of the first natural language processing model, the second natural language processing model, or the third natural language processing model is a Bi-directional Encoder Representations from Transformer (BERT).

In some embodiments, when generating the corresponding record category vector, the at least one non-transitory memory and the computer program code are configured to, with the at least one processor, cause the apparatus to: select the third natural language processing model, from a plurality of natural language processing models, based at least in part on the corresponding record category identifier.

In some embodiments, the one or more record category identifiers comprise at least one of: a diagnosis identifier, a procedure identifier, a pharmaceutical identifier, a lab test identifier, or a lab test result identifier.

In some embodiments, when associating the one or more record data elements with the one or more record text descriptors, the at least one non-transitory memory and the computer program code are configured to, with the at least one processor, cause the apparatus to: query a network database based at least in part on the one or more record data elements.

In some embodiments, when generating the one or more encounter vectors, the at least one non-transitory memory and the computer program code are configured to, with the at least one processor, cause the apparatus to: associate the one or more record data elements with one or more record text descriptors; generate one or more record text vectors based at least in part on the one or more record text descriptors and a second natural language processing model; and generate the one or more encounter vectors based at least in part on the one or more record text vectors and a third natural language processing model.

In some embodiments, when generating the one or more encounter vectors, the at least one non-transitory memory and the computer program code are configured to, with the at least one processor, cause the apparatus to: associate the one or more record data elements with one or more record category identifiers; and generate one or more record category vectors associated with the one or more record category identifiers based at least in part on the one or more record data elements.

In some embodiments, when generating a record category vector of the one or more record category vectors that is associated with a record category identifier of the one or more record category identifiers, the at least one non-transitory memory and the computer program code are configured to, with the at least one processor, cause the apparatus to: identify at least one record data element, from the one or more record data elements, being associated with the record category identifier of the one or more record category identifiers; and generate the record category vector associated with the record category identifier based at least in part on the at least one record data element and a second natural language processing model.

In some embodiments, when generating the client vector, the at least one non-transitory memory and the computer program code are configured to, with the at least one processor, cause the apparatus to: generate the client vector based at least in part on the one or more encounter identifiers and the one or more encounter vectors using the first natural language processing model.

In some embodiments, the at least one non-transitory memory and the computer program code are configured to, with the at least one processor, cause the apparatus to: calculate one or more encounter date metadata based at least in part on the one or more encounter identifiers and a base date.

In some embodiments, the first natural language processing model is configured to perform one or more of pre-computed embeddings, learned embeddings, or relative embeddings.

In some embodiments, when generating the client vector, the at least one non-transitory memory and the computer program code are configured to, with the at least one processor, cause the apparatus to: retrieve, from a network database, profile data element corresponding to the client identifier; and combine the client vector with the profile data element based at least in part on one or more of summation, multiplication, or one or more artificial neural networks.

In some embodiments, prior to generating the prediction data element, the at least one non-transitory memory and the computer program code are configured to, with the at least one processor, cause the apparatus to: generate a training dataset; and train the machine learning model based at least in part on the training dataset. In some embodiments, the training dataset comprises a plurality of training client vectors.

In some embodiments, each of the plurality of training client vectors is associated with a corresponding client identifier. In some embodiments, the at least one non-transitory memory and the computer program code are configured to, with the at least one processor, cause the apparatus to: retrieve client health metadata associated with the corresponding client identifier for each of the plurality of training client vectors; and associate each of the plurality of training client vectors with the client health metadata.

In some embodiments, when training the machine learning model, the at least one non-transitory memory and the computer program code are configured to, with the at least one processor, cause the apparatus to: classify a training client vector of the plurality of training client vectors with respect to a corresponding client health metadata using the machine learning model.

In some embodiments, the at least one non-transitory memory and the computer program code are configured to, with the at least one processor, cause the apparatus to: retrieve a plurality of training record data elements associated with a plurality of training client identifiers and a plurality of training encounter identifiers. In some embodiments, each of the plurality of training record data elements is associated with a training encounter identifier of the plurality of training encounter identifiers. In some embodiments, each of the plurality of training encounter identifiers is associated with a training client identifier of the plurality of training client identifiers.

In some embodiments, the at least one non-transitory memory and the computer program code are configured to, with the at least one processor, cause the apparatus to: generate a plurality of training encounter vectors associated with the plurality of training client identifiers and the plurality of training encounter identifiers based at least in part on the plurality of training record data elements. In some embodiments, each of the plurality of training encounter vectors is associated with one of the plurality of training encounter identifiers and one of the plurality of training client identifiers.

In some embodiments, the at least one non-transitory memory and the computer program code are configured to, with the at least one processor, cause the apparatus to: generate the plurality of training client vectors based at least in part on the plurality of training encounter vectors and the first natural language processing model.

In some embodiments, the prediction data element comprises one or more of: a presence/absence determination indicator, a probability of occurrence indicator, a timespan to which the probability of occurrence applies indicator, a severity of occurrence indicator, or a timespan to which the severity applies indicator.

In some embodiments, when performing the at least one data operation, the at least one non-transitory memory and the computer program code are configured to, with the at least one processor, cause the apparatus to further: transmit the prediction data element to a client computing entity.

In accordance with various embodiments of the present disclosure, a computer-implemented method is provided. The computer-implemented method may comprise retrieving one or more record data elements associated with a client identifier, wherein each of the one or more record data elements is associated with an encounter identifier of one or more encounter identifiers, wherein the one or more encounter identifiers are associated with the client identifier; generating one or more encounter vectors based at least in part on the one or more record data elements, wherein the one or more encounter vectors are associated with the one or more encounter identifiers; generating a client vector based at least in part on the one or more encounter vectors, wherein the client vector is associated with the client identifier; generating a prediction data element based at least in part on the client vector and a machine learning model, wherein the prediction data element is associated with the client identifier; and performing at least one data operation based at least in part on the prediction data element. In some embodiments, a first natural language processing model is associated with at least one of the one or more encounter vectors or the client vector. For example, the first natural language processing model may be implemented to generate one or more encounter vectors. Additionally, or alternatively, the first natural language processing model may be implemented to generate the client vector.

In accordance with various embodiments of the present disclosure, a computer program product is provided. The computer program product may comprise at least one non-transitory computer-readable storage medium having computer-readable program code portions stored therein. The computer-readable program code portions may comprise an executable portion configured to retrieve one or more record data elements associated with a client identifier, wherein each of the one or more record data elements is associated with an encounter identifier of one or more encounter identifiers, wherein the one or more encounter identifiers are associated with the client identifier; generate one or more encounter vectors based at least in part on the one or more record data elements, wherein the one or more encounter vectors are associated with the one or more encounter identifiers; generate a client vector based at least in part on the one or more encounter vectors, wherein the client vector is associated with the client identifier; generate a prediction data element based at least in part on the client vector and a machine learning model, wherein the prediction data element is associated with the client identifier; and perform at least one data operation based at least in part on the prediction data element. In some embodiments, a first natural language processing model is associated with at least one of the one or more encounter vectors or the client vector. For example, the first natural language processing model may be implemented to generate one or more encounter vectors. Additionally, or alternatively, the first natural language processing model may be implemented to generate the client vector.

In accordance with examples of the present disclosure, a computer-implemented method for classifying a relationship of a first patient with respect to a health state is provided. The computer-implemented method comprises:
 (a) generating an encounter vector associated with each of one or more visits, wherein: generating the encounter vector comprises processing data elements associated with a visit of the one or more visits; and the visit is associated with the first patient; and
 (b) generating a client vector, wherein generating the client vector comprises using a first transformer to encode one or more encounter vectors associated with the first patient; and
 (c) determining the relationship of the first patient with respect to the health state using a supervised learning model to classify the client vector.

In some embodiments, (d) the supervised learning model has been trained to classify a first set of client vectors with respect to the health state, wherein the first set of client vectors: (i) comprises client vectors generated in step (e); and (ii) has been labeled with respect to the health state; and
 (e) for each of multiple patients: (i) an encounter vector has been generated for each of one or more visits; and (ii) a client vector has been generated using the first transformer to encode the one or more encounter vectors.

In some embodiments, when generating the encounter vector (with respect to one or more data elements associated with a visit), the computer-implemented method comprises:
 associating the one or more data elements with respective record categories (each a record category);
 associating the one or more data elements with respective texts (each a text);
 encoding each of the respective texts with a second transformer to yield respective text vectors (each a text vector);
 for each record category associated with the visit, generating a record category vector using a third transformer to encode one or more text vectors, each of the one or more text vectors associated with each record category;
 if only one record category vector is associated with the visit, generating the encounter vector using the only one record category vector; and
 if multiple record category vectors are associated with the visit, generating the encounter vector using a combination of the multiple record category vectors.

In some embodiments, when generating an encounter vector (with respect to one or more data elements associated with a visit), the computer-implemented method comprises:
 associating the one or more data elements with respective texts (each a text);
 encoding each of the respective texts with a second Transformer to yield respective text vectors (each a text vector);
 generating the encounter vector using a third transformer to encode one or more text vectors.

In some embodiments, when generating an encounter vector (with respect to one or more data elements associated with a visit), the computer-implemented method comprises:
 associating the one or more data elements with respective record categories (each a record category);
 for each record category associated with the visit, generating a record category vector using a second transformer to encode one or more data elements associated with each record category;
 if only one record category vector is associated with the visit, generating the encounter vector using the only one record category vector; and if multiple record category vectors are associated with the visit, generating the encounter vector using a combination of the multiple record category vectors.

In some embodiments, the respective record categories comprise at least one of: a diagnosis; a procedure; a pharmaceutical; a lab test; or a lab test result.

In some embodiments, associating the one or more data elements with the respective text comprises an automated network search using at least one of one or more data elements as a search term.

In some embodiments, at least one of the first transformer, the second transformer, or the third Transformer has been pretrained using BERT.

In some embodiments, classifying the relationship of the first patient with respect to the health state comprises predicting one or more of: a presence/absence determination, a probability of occurrence; a timespan to which the probability applies; a severity of occurrence; or a timespan to which the severity applies.

In some embodiments, generating the encounter vector using the combination of the multiple record category vectors comprises one or more of: summation, multiplication, or one or more neural networks.

In some embodiments, a computer-implemented method for training a supervised learning model to classify patient records with respect to a health state is provided. In some embodiments, the computer-implemented method comprising:

(a) training the supervised learning model to classify a first set of client vectors with respect to the health state, wherein: (i) the first set of client vectors was generated according to steps (b) and (c); and (ii) the first set of client vectors has been labeled with respect to the health state; and (b) wherein, for each of multiple patients, an encounter vector associated with each of one or more visits has been generated, wherein: each of one or more data elements is associated with one of the one or more visits; and the one of the one or more visits is associated with the each of the multiple patients; and (c) wherein, for each of the multiple patients, a client vector has been generated using a first transformer to encode one or more encounter vectors, wherein each of the encounter vectors is associated with the each of the multiple patients.

In some embodiments, the computer-implemented method further comprising classifying a client vector of a first patient with respect to the health state using the supervised learning model, wherein:

(d) an encounter vector associated with each of one or more visits of the first patient has been generated; and (e) a client vector of the first patient has been generated using the first transformer to encode one or more encounter vectors associated with the first patient.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 1:
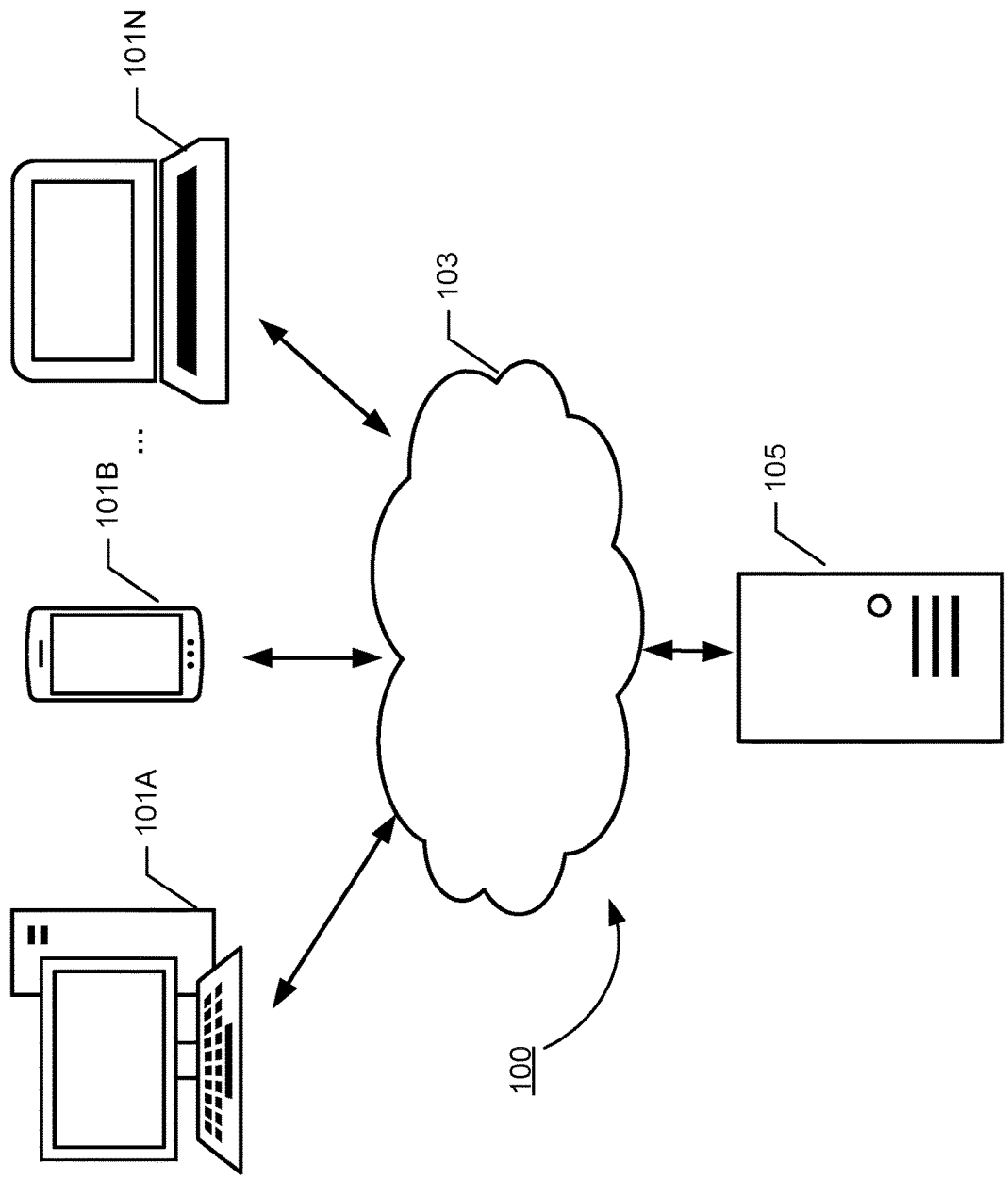
FIG. 1 is a diagram of an example vector generating platform/system that can be used in accordance with various embodiments of the present disclosure.

FIGS. 4, 5, 6, 7, 8, 9, 10, 11, 12, 13, 14, 15, 16, 17, 18, and 19 provide example flowcharts and diagrams illustrating example steps, processes, procedures, and/or operations associated with an example vector generating platform/system in accordance with various embodiments of the present disclosure.

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment).

I. Computer Program Products, Methods, and Computing Entities

Embodiments of the present disclosure may be implemented as computer program products that comprise articles of manufacture. Such computer program products may include one or more software components including, for example, applications, software objects, methods, data structures, and/or the like. A software component may be coded in any of a variety of programming languages. An illustrative programming language may be a lower-level programming language such as an assembly language associated with a particular hardware architecture and/or operating system platform/system. A software component comprising assembly language instructions may require conversion into executable machine code by an assembler prior to execution by the hardware architecture and/or platform/system. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Additionally, or alternatively, embodiments of the present disclosure may be implemented as a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media may include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of a vector generating platform/system 100 that can be used in conjunction with various embodiments of the present disclosure. As shown in FIG. 1, the vector generating platform/system 100 may comprise one or more vector computing entities 105, one or more client computing entities 101A, 101B, . . . 101N, and one or more networks 103. Each of the components of the vector generating platform/system 100 may be in electronic communication with, for example, one another over the same or different wireless or wired networks 103 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

a. Exemplary Vector Computing Entity

Figure 2:
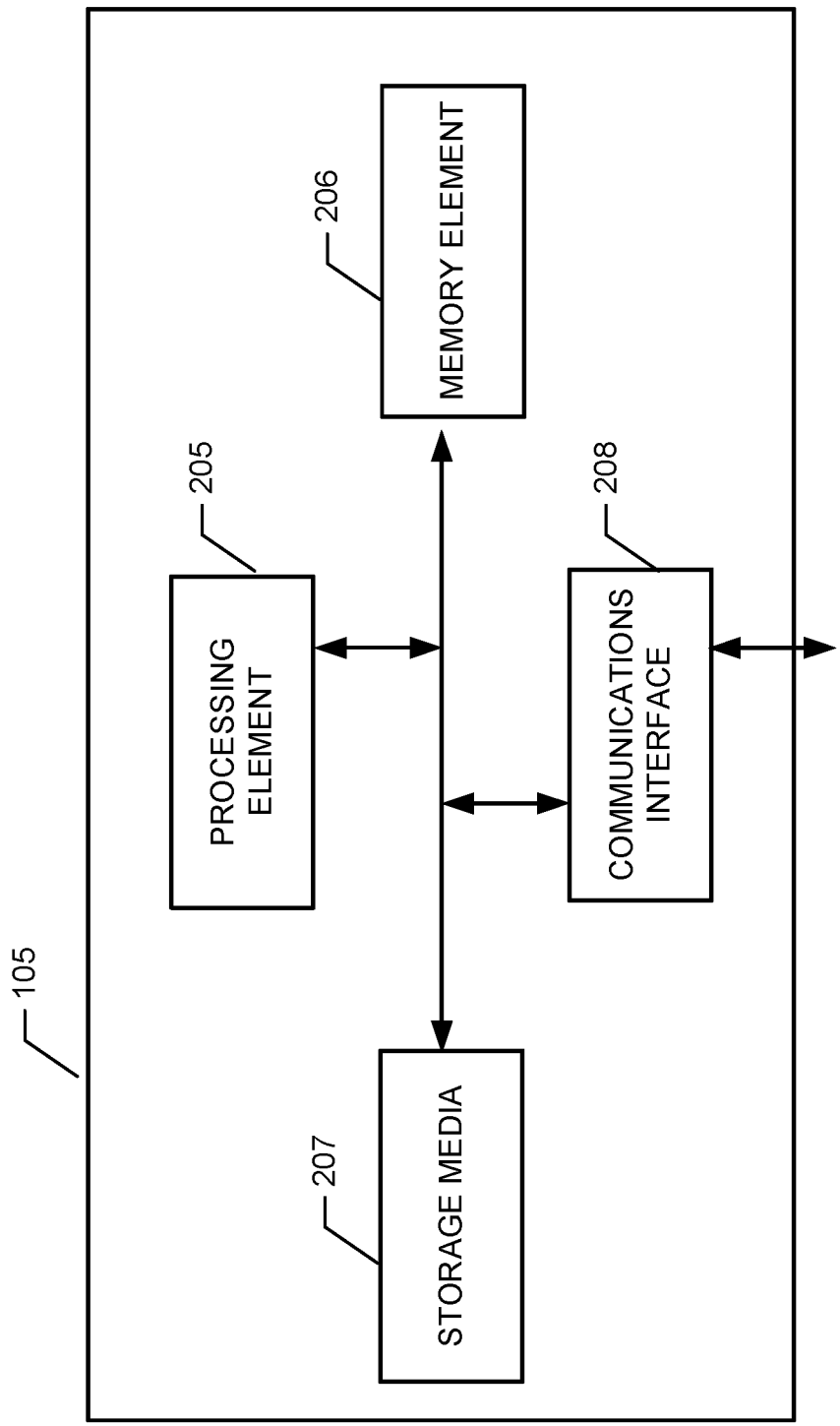
FIG. 2 is a schematic representation of an example vector computing entity in accordance with various embodiments of the present disclosure.

FIG. 2 provides a schematic of a vector computing entity 105 according to one embodiment of the present disclosure. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

As indicated, in one embodiment, the vector computing entity 105 may also include one or more network and/or communications interface 208 for communicating with various computing entities, such as by communicating data, content, information, and/or similar terms used herein that can be transmitted, received, operated on, processed, displayed, stored, and/or the like. For instance, the vector computing entity 105 may communicate with other vector computing entities 105, one or more client computing entities 101A-101N, and/or the like.

As shown in FIG. 2, in one embodiment, the vector computing entity 105 may include or be in communication with one or more processing elements (for example, processing element 205) (also referred to as processors, processing circuitry, and/or similar terms used herein interchangeably) that communicate with other elements within the vector computing entity 105 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the vector computing entity 105 may further include or be in communication with volatile media (also referred to as volatile storage, memory, memory storage, memory circuitry and/or similar terms used herein interchangeably). In one embodiment, the volatile storage or memory may also include one or more memory element 206 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 206 may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205 as shown in FIG. 2 and/or the processing element 308 as described in connection with FIG. 3. Thus, the databases, database instances, database management system entities, data, applications, programs, program modules, scripts, source code, object code, byte code, compiled code, interpreted code, machine code, executable instructions, and/or the like may be used to control certain aspects of the operation of the vector computing entity 105 with the assistance of the processing element 205 and operating system.

In one embodiment, the vector computing entity 105 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or storage media 207 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 207 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Storage media 207 may also be embodied as a data storage device or devices, as a separate database server or servers, or as a combination of data storage devices and separate database servers. Further, in some embodiments, storage media 207 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery prediction system may be stored. Further, the information/data required for the operation of the recovery prediction system may also be partially stored in the cloud data storage system and partially stored in a locally maintained data storage system. More specifically, storage media 207 may encompass one or more data stores configured to store information/data usable in certain embodiments.

As indicated, in one embodiment, the vector computing entity 105 may also include one or more network and/or communications interface 208 for communicating with various computing entities, such as by communicating data, content, information, and/or similar terms used herein interchangeably that can be transmitted, received, operated on, processed, displayed, stored, and/or the like. For instance, the vector computing entity 105 may communicate with computing entities or communication interfaces of other vector computing entities 105, client computing entities 101A-101N, and/or the like.

As indicated, in one embodiment, the vector computing entity 105 may also include one or more network and/or communications interface 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the vector computing entity 105 may be configured to communicate via wireless external communication networks using any of a variety of protocols, such as general packet radio service (GPRS), Universal Mobile Telecommunications System (UMTS), Code Division Multiple Access 1900 (CDMA1900), CDMA1900 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The vector computing entity 105 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the vector computing entity's components may be located remotely from components of other vector computing entities 105, such as in a distributed system. Furthermore, one or more of the components may be aggregated and additional components performing functions described herein may be included in the vector computing entity 105. Thus, the vector computing entity 105 can be adapted to accommodate a variety of needs and circumstances.

b. Exemplary Client Computing Entity

Figure 3:
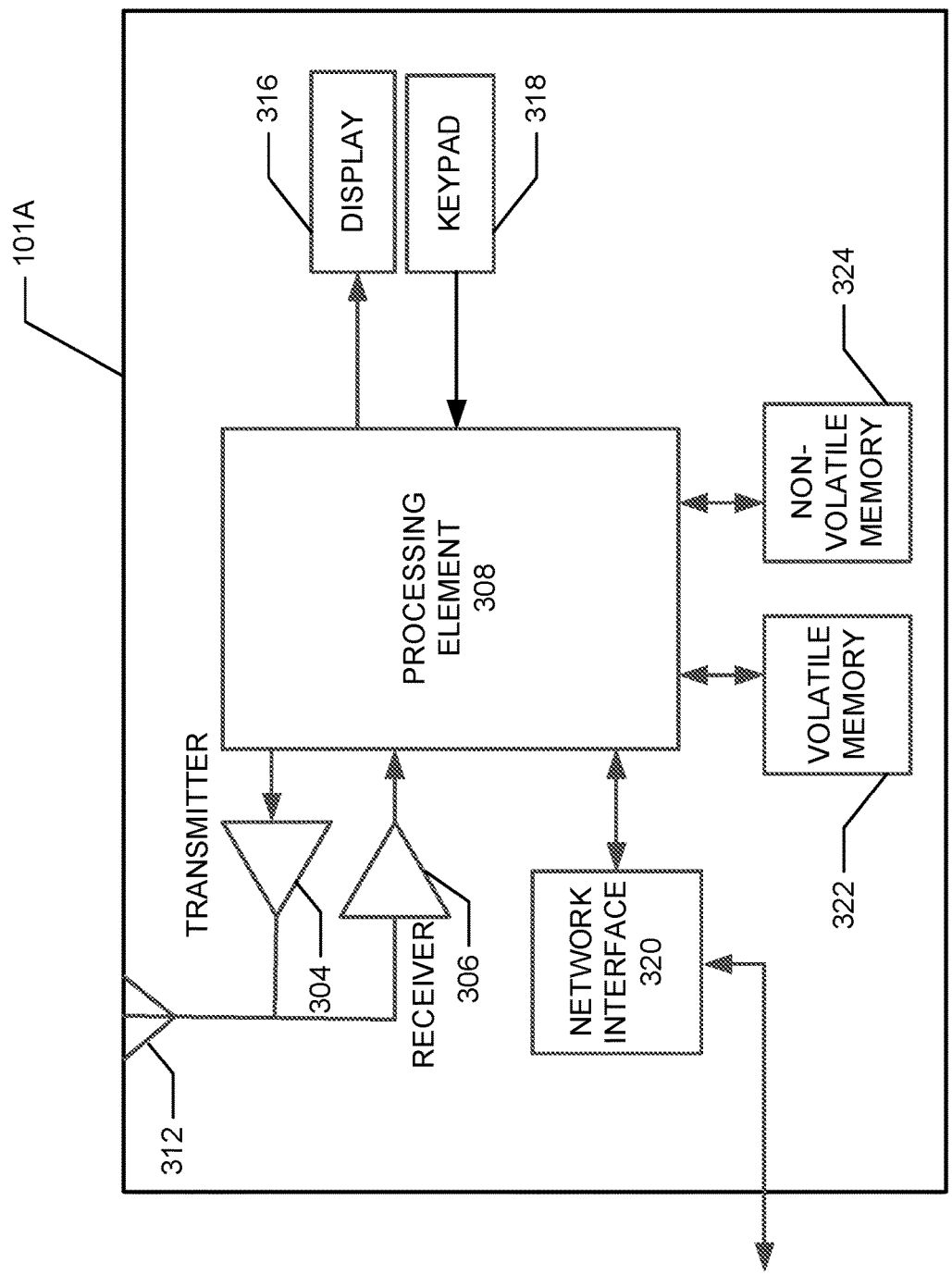
FIG. 3 is a schematic representation of an example client computing entity in accordance with various embodiments of the present disclosure.

FIG. 3 provides an illustrative schematic representative of one of the client computing entities 101A to 101N that can be used in conjunction with embodiments of the present disclosure. As will be recognized, the client computing entity may be operated by an agent and include components and features similar to those described in conjunction with the vector computing entity 105. Further, as shown in FIG. 3, the client computing entity may include additional components and features. For example, the client computing entity 101A can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a vector computing entity 105, another client computing entity 101A, and/or the like. In this regard, the client computing entity 101A may be capable of operating with one or more air interface standards, communication protocols, modulation types, and access types. More particularly, the client computing entity 101A may comprise a network interface 320, and may operate in accordance with any of a number of wireless communication standards and protocols. In a particular embodiment, the client computing entity 101A may operate in accordance with multiple wireless communication standards and protocols, such as GPRS, UMTS, CDMA1900, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the client computing entity 101A can communicate with various other entities using Unstructured Supplementary Service data (USSD), Short Message Service (SMS), Multimedia Messaging Service (MMS), Dual-Tone Multi-Frequency (DTMF) Signaling, Subscriber Identity Module Dialer (SIM dialer), and/or the like. The client computing entity 101A can also download changes, add-ons, and updates, for instance, to its firmware, software (e.g., including executable instructions, applications, program modules), and operating system.

According to one embodiment, the client computing entity 101A may include location determining aspects, devices, modules, functionalities, and/or similar words used herein interchangeably. For example, the client computing entity 101A may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the client computing entity 101A may include indoor positioning aspects, such as a location module adapted to acquire, for example, latitude, longitude, altitude, geocode, course, direction, heading, speed, time, date, and/or various other information/data. Some of the indoor aspects may use various position or location technologies including Radio-Frequency Identification (RFID) tags, indoor beacons or transmitters, Wi-Fi access points, cellular towers, nearby computing devices (e.g., smartphones, laptops) and/or the like. For instance, such technologies may include iBeacons, Gimbal proximity beacons, Bluetooth Low Energy (BLE) transmitters, Near Field Communication (NFC) transmitters, and/or the like. These indoor positioning aspects can be used in a variety of settings to determine the location of someone or something to within inches or centimeters.

The client computing entity 101A may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the client computing entity 101A to cause display or audible presentation of information/data and for user interaction therewith via one or more user input interfaces. The user output interface may be updated dynamically from communication with the vector computing entity 105. The user input interface can comprise any of a number of devices allowing the client computing entity 101A to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the client computing entity 101A and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the client computing entity 101A can collect information/data, user interaction/input, and/or the like.

The client computing entity 101A can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the client computing entities 101A-101N.

c. Exemplary Networks

In one embodiment, the networks 103 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 103 may have any suitable communication range associated therewith and may include, for example, global networks (e.g., the Internet), MANs, WANs, LANs, or PANs. In addition, the networks 103 may include medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms/systems provided by network providers or other entities.

Further, the networks 103 may utilize a variety of networking protocols including, but not limited to, TCP/IP based networking protocols. In some embodiments, the protocol is a custom protocol of JavaScript Object Notation (JSON) objects sent via a Websocket channel. In some embodiments, the protocol is JSON over RPC, JSON over REST/HTTP, and/or the like.

III. Exemplary Operation

Reference will now be made to FIGS. 4, 5, 6, 7, 8, 9, 10, 11, 12, 13, 14, 15, 16, 17, 18, and 19, which provide flowcharts and diagrams illustrating example steps, processes, procedures, and/or operations associated with a vector generating platform/system and/or a vector computing entity in accordance with various embodiments of the present disclosure.

While example embodiments of the present disclosure may be described in the context of electronic medical records ("EMRs"), as will be recognized, embodiments of the present disclosure are not limited to this context only.

a. Overview

In conducting data analytics and/or data prediction, natural language processing and machine learning systems and methods may receive data element(s) from a variety of different data sources and may analyze the data element(s) to derive meaningful information such as, but not limited to, inference information, trend information, and/or the like. As noted above, Applicant has identified many technical challenges, deficiencies and problems associated with natural language processing and machine learning systems and methods.

For example, data element(s) may be associated with, correlated to, and/or comprise temporal information. As used herein, the term "temporal information" refers to data or information that is related to, associated with, or represents a point in time, a series of time points, one or more time periods between time points, and/or the like. In data analytics and data prediction, temporal information can provide valuable information related to data elements that are associated with, correlated to, and/or comprise temporal information.

As an example, electronic medical record ("EMR") refers to a type of data element that represents data and information associated with one or more patients who conducted one or more visits to a doctor's office, a clinic, a pharmacy, a hospital, and/or the like to seek medical help, medical treatment, medical assistance, pharmacy prescriptions, and/or the like. EMRs may be electronically stored in a digital format (for example, in a non-transitory memory or a storage device), and may include, but not limited to, provider records (such as, but not limited to, notes and information collected by and/or for the clinicians in a doctor's office, a clinic, a pharmacy, a hospital, and/or the like), claim data (such as, but not limited to, medical insurance claims submitted by a patient, a doctor's office, a clinic, a pharmacy, a hospital, and/or the like), and/or other health-related data associated with the one or more patients who conducted the one or more visits.

In this example, EMRs may be associated with, correlated to, and/or comprise temporal information. For example, each of EMR(s) of a patient may be associated with, correlated to, and/or comprise the date and/or time when a patient conducted the visit to the doctor's office, the clinic, the pharmacy, the hospital, and/or the like. As an example, if a patient visited a doctor's office on Jan. 1, 2021, a corresponding EMR may be generated by the doctor's office and may comprise data and/or information associated with the doctor's visit. The corresponding EMR is associated with, correlated to, and/or comprises temporal information representing Jan. 1, 2021 (e.g. a point in time). As another example, if a patient visited the doctor's office multiple times during January 2021, multiple EMRs may be generated by the doctor's office and may comprise data and/or information associated with a corresponding doctor's visit. Each of the EMRs may be associated with, correlated to, and/or comprise temporal information representing a corresponding date/time of a corresponding visit. EMRs in this example are associated with, correlated to, and/or comprise temporal information representing a series of time points.

While temporal information can provide valuable information when conducting data analytics and data prediction, many natural language processing and machine learning systems and methods fail to capture or incorporate temporal information. Continuing from the EMR example above, many natural language processing and machine learning systems combine multiple EMRs from different visits together into one data object and without capturing the temporal information (e.g. without encoding the time points of each visit and/or time periods between visits), and thereby erasing valuable information from the EMRs before any data analytics/prediction is conducted. As such, these natural language processing and machine learning systems fail to produce accurate results in data analysis and data prediction, and may create further challenges and difficulties in downstream data operations.

In addition, many natural language processing and machine learning systems and methods face technical challenges and difficulties in conducting data analytics and data prediction due to data structure incompatibility. As described above, many natural language processing and machine learning systems and methods may receive data elements from a variety of different data sources. However, each data source may have its own formatting guidelines and protocols to structure data elements, resulting in data elements from different data sources having vastly different formats and/or structures. Because of the different formats and/or structures in data elements, many natural language processing and machine learning systems fail to conduct data analytics and data prediction on these data elements.

Continuing from the example above, EMR may provide a wealth of information that could be informative as to how patients progress towards certain disease states. However, EMRs can vary greatly in format and content among providers and institutions, and it is accordingly difficult to analyze these EMRs using natural language processing and machine learning systems. Manually curating EMRs to a consistent format is not only costly and labor-intensive, but also error-prone and may result in false results from data analytics and data prediction.

Various embodiments of the present disclosure overcome many technical challenges and technical difficulties, including those discussed above.

For example, various embodiments of the present disclosure may utilize one or more natural language processing models to transform record data elements associated with patient visits into vectors. Such vectors are structured in accordance with a universal format and structure, and have a fixed size. In conducting data prediction, vectors may be provided to a machine learning model to generate one or more prediction data elements. As such, various embodiments of the present disclosure overcome technical challenges associated with data structure incompatibility when conducting data analytics and data prediction, and may improve the interpretability of data elements.

As another example, to capture temporal information, various embodiments of the present disclosure may generate one or more encounter vectors (for example, each representing data/information associated with a patient visit). Additionally, or alternatively, based at least in part on the one or more encounter vectors and/or the encounter identifiers (for example, time points of each patient visit and/or time period(s) between patient visits), various embodiments of the present disclosure may capture and incorporate temporal information in data analysis and data prediction, and may provide more accurate analytics and prediction results.

Continuing from the EMR example above, various embodiments of the present disclosure may apply natural language processing models (such as transformers) to raw/uncurated EMR data to encode into vectors (such as, but not limited to, encounter vector(s), client vector(s)). Various embodiments of the present disclosure may apply machine learning models (for example supervised learning models) to those vectors to generate a prediction data element that represents prediction information on, for example, a patient's progression towards disease states. As such, instead of predicting only linguistic outcomes, various embodiments of the present disclosure utilize a combination of transformer model(s) and machine learning model(s) to more accurately predict progression towards diseases or other health states.

Example embodiments of the present disclosure may convert non-text input data or medical codes into text-based representations, generate text-based feature vectors based text-based representations, and/or generate visit representations independently for each visit and based at least in part on the text-based representations. Various embodiments of the present disclosure may generate text-based representations or text vectors based at least in part on text associated with non-textual EMR input data. Various embodiments of the present disclosure may generate one or more encounter vectors, each encounter vector corresponding to one medical visit. Various embodiments of the present disclosure may convert non-textual or medically coded EMR input data into text-based representations, process the text-based representations using a bidirectional transformer model to generate text-based feature vectors, generate one or more encounter vectors corresponding to one or more medical visits and based at least in part on the text-based feature vectors, and generate a client vector based at least in part on the one or more encounter vectors.

As described in detail herein, various embodiments of the present disclosure may perform separate transformer encoding of record data elements (e.g. EMRs) at the encounter/visit level and at the client/patient level, may apply separate transformer encoding to each record category (e.g., diagnosis, treatment, prescription) associated with an encounter/visit, and/or may apply the transformer model to text descriptors associated with record data element (e.g. EMR). Technical advantages and improvements provided by various embodiments of the present disclosure may include, but not limited to, eliminating the limitation of manually curating EMR data and improving precision and accuracy of data predictions yielded by various embodiments of the present disclosure. For example, with respect to the prediction of rheumatoid arthritis, example embodiments of the present disclosure demonstrate exceptionally accurate and precise predictions. As such, implementing various embodiments of the present disclosure may assist in identifying individuals who are progressing towards particular disease states so that earlier, more targeted, and more effective interventions can be administered.

b. Definitions

In the present disclosure, the term "record data element" refers to a data structure that comprises, represents, and/or records data and/or information. Continuing from the EMR example, in some embodiments, an example record data element is an EMR and comprises, represents, and/or records data and/or information associated with one or more patients who conducted one or more visits to a doctor's office, a clinic, a pharmacy, a hospital, and/or the like to seek medical help, medical treatment, medical assistance, pharmacy prescriptions, and/or the like. In such an example, each record data element is associated with a patient (also referred to as a "client" interchangeably herein) who is described by the record data element, a provider who generates, records, and/or stores the record data element (such as, but not limited to, a doctor's office, a clinic, a pharmacy, a hospital, and/or the like), and a date of a visit (also referred to as an "encounter") on which the provider observed the patient's condition, provided treatments on the patient, supplied prescription drugs to the patient, and/or the like.

In the present disclosure, the term "client identifier" refers to an identifier that uniquely identifies data and information (such as, but not limited to, record data elements) stored in a network computer system that is related to a client (such as a patient). In some embodiments, a client identifier may comprise American Standard Code for Information Interchange (ASCII) text, a pointer, a memory address, and the like.

Continuing from the EMR example above, in some embodiments, an example client identifier may be in the form of a character string (for example, a user identification, a username, etc.) that uniquely identifies data and/or information (for example, EMRs) associated with a patient and stored in a network computer system.

In the present disclosure, the term "encounter" refers to any time-based event (such as, but not limited to, a visit to a doctor's office, a clinic, a pharmacy, a hospital, automotive repair shop, space station, and/or the like). For example, an encounter may include, but not limited to, a visit by a patient to the doctor's office, a clinic, a pharmacy, a hospital, and/or the like. In some embodiments, an encounter is associated with temporal information (such as, but not limited to, the date and/or time associated with the visit). In some embodiments, a record data element is associated with an encounter. For example, when a patient visits a doctor's office, a record data element (such as an EMR) may be generated and associated with the encounter.

While the description above provides an example of "encounter," it is noted that the scope of the present disclosure is not limited to the description above. In some embodiments, an example encounter can be outside of the medical context. In some embodiments, an encounter may encompass an event that is time-based.

In the present disclosure, the term "encounter identifier" refers to a temporal identifier that identifies data and/or information (for example, but not limited to, record data element) associated with an encounter. In some embodiments, an encounter identifier may comprise American Standard Code for Information Interchange (ASCII) text, a pointer, a memory address, and the like.

Continuing from the EMR example above, in some embodiments, an example encounter identifier may comprise a time code or a timestamp that identifies the data and/or information associated with a record data element (for example, an EMR).

In the present disclosure, the term "base date" refers to a reference date from which other temporal information may be compared to. Continuing from the EMR example above, in some embodiments, a base date may be the earliest date in a series of encounter identifiers associated with a client identifier. Additionally, or alternatively, a base date may be the date of a previous visit. Additionally, or alternatively, a base date may be any other date.

In the present disclosure, the term "encounter date metadata" refers to a type of metadata that represents a date measured from a base date. Continuing from the EMR example above, an encounter date metadata for each encounter identifier associated with a client identifier can be calculated based at least in part on the base date and the time period between the base date and the corresponding encounter identifier, details of which are described herein.

In the present disclosure, the term "record category" refers to a category or a classification associated with or assigned to data and/or information in a record data element. In some embodiments, a record category may indicate a record type associated with a record data element. In some embodiments, one or more record categories are associated with a record data element. In some embodiments, one or more record data elements are associated with a record category.

Continuing from the EMR example above, data and/or information in EMRs can often be automatically and/or manually associated with or assigned to a record category. Examples of record categories include, but not limited to, diagnoses, prescriptions, treatments, and/or the like.

In some embodiments, record categories associated with record data elements can be identified based at least in part on the use of uniform coding systems for each of those record types. In the EMR example, an EMR may comprise medical coding based at least in part on different medical coding systems, and each medical coding system used in association with an EMR indicates a corresponding record category. For example, International Classification of Diseases (ICD) is a system of diagnosis codes (the use of ICD in the United States is nearly universal for EMRs associated with healthcare claims). When an EMR comprises medical coding based at least in part on the ICD system, it indicates that the EMR is associated with a diagnosis category. Other record categories may include, but not limited to, procedure categories (for example, based at least in part on the Current Procedural Terminology (CPT) codes), pharmaceutical categories (for example, corresponding to pharmaceutical claims submitted by one or more pharmacies), lab test categories (for example, associated with types of lab test), lab test result categories (for example, associated with lab test results), and/or the like.

In the present disclosure, the term "record category identifier" refers to an identifier that uniquely identifies a record category associated with a record data element. In some embodiments, a record category identifier may comprise American Standard Code for Information Interchange (ASCII) text, a pointer, a memory address, and the like.

Continuing from the EMR example above, in some embodiments, example record category identifiers may comprise at least one of: a diagnosis identifier (which uniquely identifies a diagnosis category associated with the record data element, such as, but not limited to, an ICD code), a procedure identifier (which uniquely identifies a procedure category associated with the record data element, such as, but not limited to, a CPT code), a pharmaceutical identifier (which uniquely identifies a pharmaceutical category associated with the record data element), a lab test identifier (which uniquely identifies a lab test category associated with the record data element), or a lab test result identifier (which uniquely identifies a lab test result category associated with the record data element).

In the present disclosure, the term "record text descriptor" refers to a text descriptor associated with a record data element and/or a record category. For example, a record text descriptor may comprise textual data associated with one or more record data elements. Additionally, or alternatively, a record text descriptor may comprise textual data associated with one or more record categories that are related to the record data element.

Continuing from the EMR example above, in some embodiments, an example record text descriptor may comprise textual description associated with the EMR (for example, data and/or information collected by and/or for the clinicians in a doctor's office, a clinic, a pharmacy, a hospital, and/or the like). Additionally, or alternatively, in some embodiments, an example record text descriptor may comprise textual description associated with a record category related to the EMR (for example, but not limited to, textual data and/or description associated with an ICD code, a CPT code, and/or the like).

In the present disclosure, the term "vector" refers to a data structure that represents one or more features associated with data/or information (for example, but not limited to, record data elements, encounters, record categories) in an organized format. In some embodiments, an example vector may encode one or more lengths and one or more directions in a vector space based at least in part on the one or more features associated with data and/or information. In some embodiments, an example vector may be generated by implementing a natural language processing model to encode data and/or information, details of which are described herein.

In the present disclosure, the term "record category vector" refers to a type of vector that is generated based at least in part on data and/or information associated with one (or more) record category. In some embodiments, an example record category vector represents features associated with a corresponding record category.

Continuing from the EMR example above, a record category vector may be generated for a diagnosis category associated with a record data element based at least in part on data and/or information associated with an ICD code. Additionally, or alternatively, a record category vector may be generated for a procedure category, a pharmaceutical category, a lab test category, a lab test result category, and/or the like.

In the present disclosure, the term "record text vector" refers to a type of vector that is generated based at least in part on data and/or information associated with one (or more) record text descriptor. As described above, an example record text descriptor may comprise textual data associated with one or more record data elements and/or one or more record categories.

Continuing from the EMR example above, an example record text vector may be generated based at least in part on one or more record text descriptors that comprise textual data associated with one or more record data elements. For example, example embodiments of the present disclosure may encode data and/or information collected by and/or for the clinicians in a doctor's office, a clinic, a pharmacy, a hospital, and/or the like into one or more record text vectors.

Additionally, or alternatively, an example record text vector may be generated based at least in part on one or more record text descriptors that comprise textual data associated with one or more record categories. For example, some embodiments of the present disclosure may encode textual data and/or description associated with an ICD code, a CPT code, and/or the like into one or more record text vectors.

In the present disclosure, the term "encounter vector" refers to a type of vector that is generated based at least in part on data and/or information associated with an encounter or a visit of a client. As described above, an encounter identifier may uniquely identify data and/or information (for example, but not limited to, record data element) associated with an encounter. Based at least in part on the data and/or information associated with an encounter, various embodiments of the present disclosure may generate one or more encounter identifiers, details of which are described herein.

In some embodiments, an encounter vector is a text-based encounter representation data object. In such examples, a processing element may generate an encounter vector based at least in part on text associated with each of the one or more record data elements associated with the encounter, details of which are described herein.

In the present disclosure, the term "client vector" refers to a type of vector that is generated based at least in part on data and/or information associated with a client (e.g. a patient). For example, an example client vector may represent features (such as, but not limited to, data and/or information from EMRs) associated with a client/patient. As described above, an encounter vector may be generated based at least in part on data and/or information associated with an encounter or a visit by a client/patient. In various embodiments of the present disclosure, a client vector may be generated based at least in part on one or more encounter vectors associated with a client. For example, an example client vector may be generated based at least in part on one or more encounter vectors associated with a particular client identifier, details of which are described herein.

In the present disclosure, the term "natural language processing model" refers to a software computer algorithm (such as, but not limited to, computer programs, machine learning models, artificial intelligence models, and/or the like) (and, in some embodiments, associated hardware) that processes, analyzes, generates, integrates, summarizes, translates, and/or predicts (and/or the like) natural language data (such as, but not limited to, written text, audio text, and/or the like). In some embodiments, an example natural language processing model is configured to perform one or more of pre-computed embeddings, learned embeddings, or relative embeddings, details of which are described herein.

While the description above provides an example of a natural language processing model, it is noted that the scope of the present disclosure is not limited to the description above. In some embodiments, an example natural language processing model may be applied to other types of data.

For example, in various embodiments of the present disclosure, an example natural language processing model is in the form of an example transformer (also referred to as "transformer model" herein). In some embodiments, the example transformer is a type of neural network architecture that is designed for natural language processing. In various embodiments, transformers and transformer models are capable of handling temporal information such as, but not limited to, longitudinal, time series data (e.g. record data elements associated with encounter identifiers). In some embodiments, transformers and transformer models are capable of not only handling natural language processing tasks, but also vision tasks, audio tasks, and/or the like. In some embodiments, one or more inputs to an example transformer model can be of any length, but the output(s) of the transformer model is of fixed length.

In some embodiments, an example natural language processing model may be trained based at least in part on one or more different methods. Continuing from the transformer example above, Bi-directional Encoder Representations from Transformer (BERT) provides an example method of training transformer and transformer models. In some embodiments, BERT creates training datasets by randomly removing data points from more complete data sets, and trains the transformer to predict the complete data based at least in part on incomplete data. In some embodiments, the training of the transformer is bi-directional in that it can use data/information both before and after a missing element to predict the missing element. In the present disclosure, a natural language processing model that has been trained using Bi-directional Encoder Representations from Transformer is also referred to as a Bi-directional Encoder Representations from Transformer (BERT), which is a type of transformer.

In some embodiments, transformer and transformer models are trained to adjust a feature's representation based at least in part on its surrounding. For example, during training, transformers may measure what percentage of each feature should be weighted by. Once this measurement process is done, the adjusted features can effectively be used to make predictions. As such, this architecture is similar to perturbation expansion of a multibody interacting system in physics.

In the present disclosure, the term "machine learning model" refers to a software computer program (and, in some embodiments, associated hardware) that is trained to process, analyze, generate, integrate, summarize, translate, and/or predict one or more output datasets based at least in part on one or more input datasets. For example, an example machine learning model may be trained to recognize patterns in the one or more input datasets, identify trends from the one or more input datasets, generate one or more predictions based at least in part on the one or more input datasets, and/or the like.

In accordance with various embodiments of the present disclosure, an example machine learning model may be embedded in a variety of different ways. For example, an example machine learning model may be in the format of an artificial neural network. The term "artificial neural network" (also referred to as "neural network") refers to a type of machine learning model that comprises one or more layers of units or nodes that are connected through edges to generate one or more output datasets that represent prediction, analysis, summaries, and/or the like based at least in part on one or more input datasets that are provided to a layer of units/nodes. As another example, an example machine learning model may be in the format of a Decision Tree. As another example, an example machine learning model may be in other formats (such as, but not limited to, Linear Regression, Logistic Regression, Naïve Bayes, and/or the like). In some embodiments, an example machine learning model is a supervised machine learning model (also referred to as a supervised learning model herein). In some embodiments, an example machine learning model is an unsupervised machine learning model (also referred to as an unsupervised learning model herein).

In some embodiments, an example machine learning model may generate a prediction data element based at least in part on one or more client vectors. In the present disclosure, the term "prediction data element" refers to a type of data element that represents and/or comprises data and/or information associated with one or more predictions associated with a client/patient. In some embodiments, the prediction data element comprises one or more of: a presence/absence determination indicator (which may indicate, for example but not limited to, whether a disease is estimated to be present or absent in a client/patient), a probability of occurrence indicator (which may indicate, for example but not limited to, an estimated probability that a disease has occurred or will likely occur in a client/patient), a timespan to which the probability of occurrence applies indicator (which may indicate, for example but not limited to, an estimated timespan to which the estimated probability applies), a severity of occurrence indicator (which may indicate, for example but not limited to, an estimated severity associated with a disease that has occurred or is estimated to has occurred or will likely occur), or a timespan to which the severity applies indicator (which may indicate, for example but not limited to, an estimated timespan to which the estimated severity applies).

In the present disclosure, the term "data operation" refers to a computer operation associated with a data element. Examples of data operations may include, but are not limited to, transmission of one or more data elements from one device to another device, rendering of one or more data elements on a user interface that is displayed on a display device, and/or the like.

As described above, a machine learning model may be trained. In the present disclosure, the term "training dataset" refers to a dataset that is retrieved or generated to train one or more machine learning models. In some embodiments, an example training dataset may comprise one or more "training client vectors."

In the present disclosure, the term "training client vector" refers to a type of client vector that is generated or retrieved for the purpose of training one or more machine learning models. In some embodiments, an example training client vector may be generated based at least in part one or more "training encounter vectors." In the present disclosure, the term "training encounter vector" refers to a type of encounter vector that is generated or retrieved for the purpose of training one or more machine learning models. In some embodiments, each training encounter vector is associated with a "training encounter identifier," which refers to a type of encounter identifier that identifies one or more encounters associated with a "training record data element." In some embodiments, an example training encounter vector may be generated based at least in part on one or more "training record data elements," which refer to a type of record data element that is generated or retrieved for the purpose of training one or more machine learning models. In some embodiments, one or more training record data elements may be associated with a "training client identifier," which is a type of client identifier that may be determined or selected programmatically or manually for generating/retrieving the training record data elements.

In the present disclosure, the term "profile data element" refers to data and/or information associated with a client. For example, an example profile data element may be stored in a central storage device, and may be retrieved based at least in part on a client identifier associated with a client. In some embodiments, the profile data element is associated with one or more other data elements (such as, but not limited to, record data elements) and/or metadata (such as, but not limited to, client health metadata, client demographic data, etc.).

In the present disclosure, the term "client health metadata" refers to a type of metadata that represents and/or comprises data related to health information of a client/patient. For example, client health metadata may represent/comprise information such as, but not limited to, disease progression associated with a client, health state associated with the client, symptoms associated with the patient and/or the like.

For example, the client health metadata may comprise one or more of presence/absence indicator (which may indicate, for example but not limited to, whether a disease is present or absent in a client/patient), a presence timespan indicator (which may indicate, for example but not limited to, a timespan that a disease is present in a client/patient), a severity indicator (which may indicate, for example but not limited to, a severity associated with a disease), or a severity timespan indicator (which may indicate, for example but not limited to, a timespan of the severity).

In some embodiments, when generating a training dataset, client health metadata associated with the client may be retrieved and used to associate with or label one or more training client vectors, details of which are described here.

In the present disclosure, the term "client demographic metadata" refers to a type of metadata that represents and/or comprises data related to demographic information of a client/patient. For example, client demographic metadata may represent/comprise information such as, but not limited to, gender, ethnicity, race, age, marital status, income, education, and/or the like associated with a client/patient. In some embodiments, when generating a client vector, client health metadata associated with the client may be retrieved, details of which are described here.

c. Exemplary Generation of Prediction Data Elements

As described above, there are technical challenges, deficiencies and problems associated with natural language processing and machine learning systems and methods, and various example embodiments of the present overcome such challenges. For example, referring now to FIG. 4, an example method 400 of generating an example prediction data element that overcomes various technical challenges in accordance with embodiments of the present disclosure is illustrated.

For example, the example method 400 captures temporal information by treating a patient's medical history as a sequence of visits, with each visit comprising a set of input features (such as, but not limited to, ICD codes and CPT codes, and the like). In some embodiments, the example method 400 may classify a relationship of a patient with respect to a health state based at least in part on a machine learning model, details of which are described herein.

Figure 4:
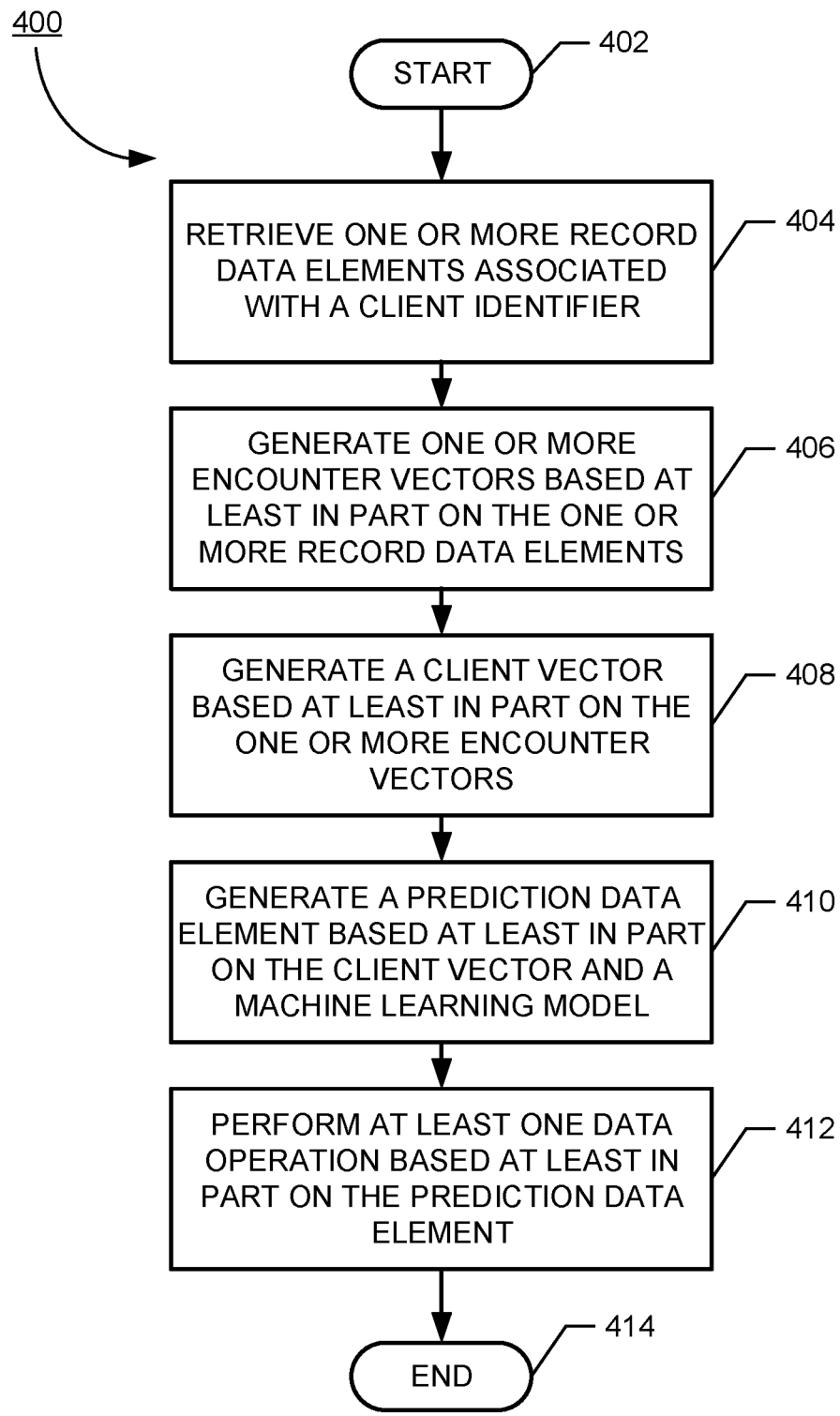

As shown in FIG. 4, the example method 400 starts at step/operation 402. Subsequent to step/operation 402, the example method 400 proceeds to step/operation 404. At step/operation 404, a computing entity (such as the vector computing entity 105 described above in connection with FIG. 1 and FIG. 2) may include means (such as the processing element 205 of the vector computing entity 105 described above in connection with FIG. 2) to retrieve one or more record data elements associated with a client identifier.

Figure 5:
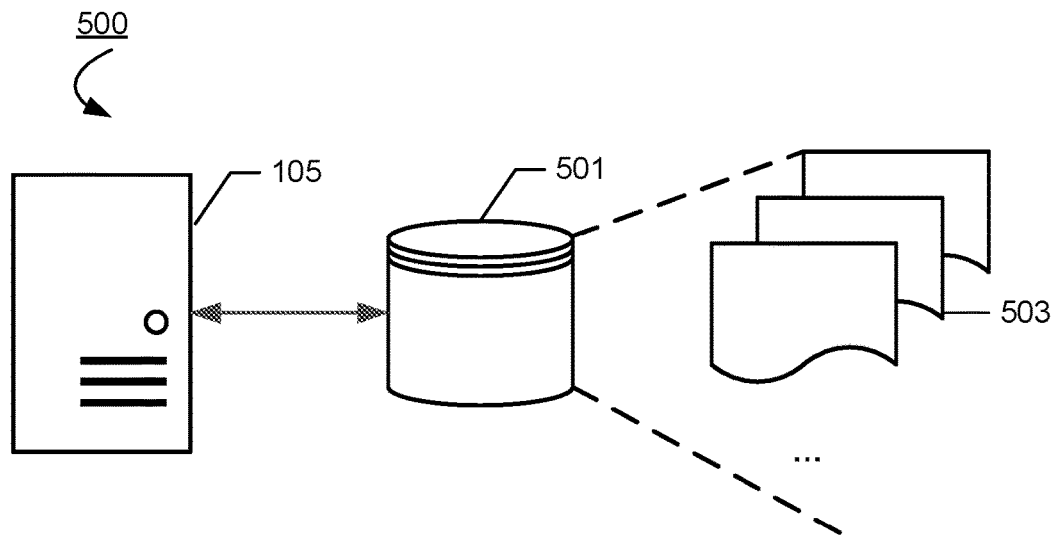

In some embodiments, the processing element may retrieve one or more record data elements from a network database. Referring now to FIG. 5, an example diagram 500 illustrates example retrieval of one or more record data elements 503 is shown. In the example shown in FIG. 5, the one or more record data elements 503 are stored in the network database 501. In some embodiments, the network database 501 is internal to the vector generating platform/system described herein. In some embodiments, the network database 501 is external to the vector generating platform/system described herein. In some embodiments, the vector computing entity 105 may retrieve the one or more record data elements 503 from the network database 501 by querying the network database 501 using a client identifier. In some embodiments, the client identifier may be programmatically selected by the vector computing entity 105. In some embodiments, the vector computing entity 105 may determine the client identifier based at least in part on one or more inputs from a client computing entity.

In some embodiments, each of the one or more record data elements associated with the client identifier and retrieved at step/operation 404 of FIG. 4 is associated with an encounter identifier of one or more encounter identifiers. In some embodiments, the one or more encounter identifiers are associated with the client identifier.

Figure 6:
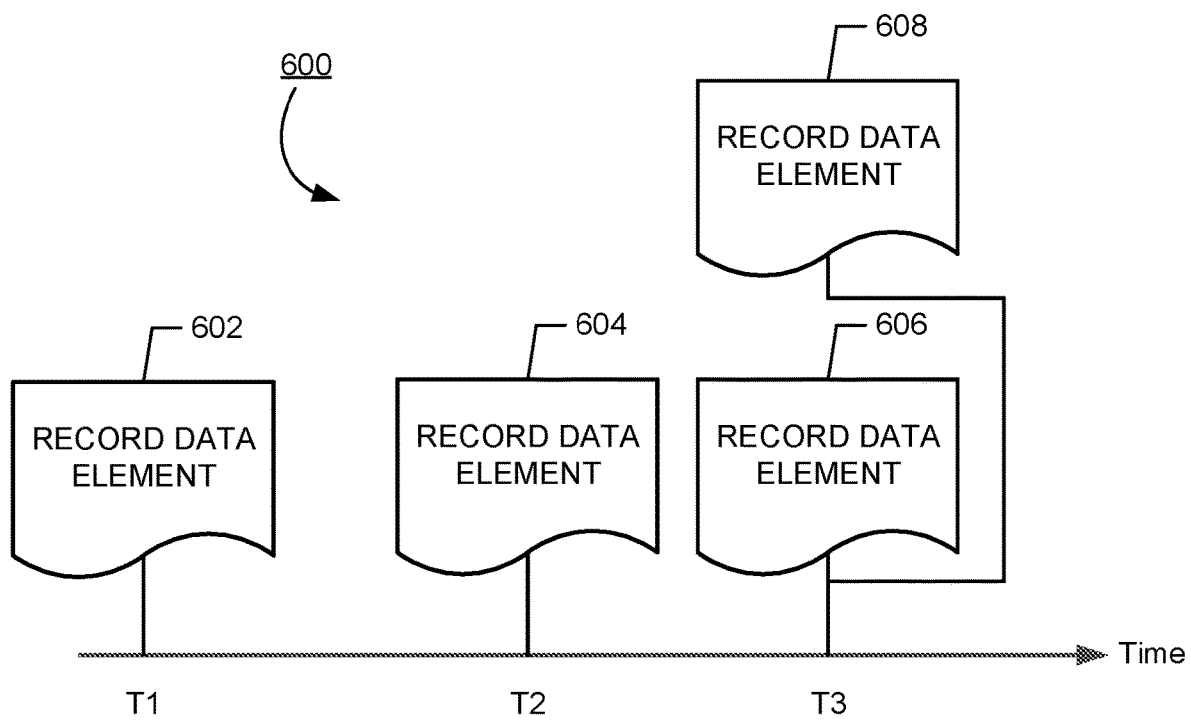

Referring now to FIG. 6, an example diagram 600 illustrates example associations between the one or more record data elements and one or more encounter identifiers. The example record data element 602, the record data element 604, the record data element 606, and the record data element 608 are associated with the same client identifier. The example diagram 600 further illustrates an encounter identifier T1, an encounter identifier T2, and an encounter identifier T3, each represents a visit associated with the patient and indexed on the time axis. In the example shown in FIG. 6, the record data element 602 is associated with an encounter identifier T1, the record data element 604 is associated with an encounter identifier T2, the record data element 606 and the record data element 608 are associated with an encounter identifier T3.

In some embodiments, the processing element may identify one or more different encounter identifiers in the one or more record data elements, and may establish a data association between each of the record data elements and each of the encounter identifiers. Continuing from the example shown in FIG. 6, subsequent to retrieving the record data element 602, the record data element 604, the record data element 606, and the record data element 608, the processing element may identify encounter identifier T1, encounter identifier T2, and encounter identifier T3 from these record data elements, and may establish a data association between record data element 602 and encounter identifier T1, between record data element 604 and encounter identifier T2, between record data element 606 and encounter identifier T3, and between record data element 608 and encounter identifier T3.

As an example, the processing element may retrieve record data elements related to a client/patient Adam, and the record data elements may be in the form of the EMRs. For example, the record data elements may include a first EMR documenting Adam's visit to the doctor's office on Jan. 1, 2021, a second EMR documenting Adam's visit to a hospital on Feb. 1, 2021, a third EMR documenting Adam's visit to the doctor's office on Apr. 1, 2021, and a fourth EMR documenting Adam's visit to a pharmacy on Apr. 1, 2021. In such an example, the first EMR, the second EMR, the third EMR, and the fourth EMR are record data elements associated with a client identifier corresponding to Adam's. The first EMR is associated with a first encounter identifier of Jan. 1, 2021. The second EMR is associated with a second encounter identifier of Feb. 1, 2021. The third EMR is associated with an encounter identifier of Apr. 1, 2021. The fourth EMR is associated with a third encounter identifier of Apr. 1, 2021. In this example, the first encounter identifier, the second encounter identifier, and the third encounter identifier are all associated with Adam's client identifier.

As described herein, a record data element may comprise or be associated with additional data and/or information, such as, but not limited to, one or more record category identifiers (such as, but not limited to, ICD codes, CPT codes, and/or the like) and/or one or more record text descriptors (such as, but not limited to, textual data and/or description associated with an ICD code, a CPT code, and/or the like). In such an example, the processing element may associate each record category identifier and/or record text descriptor with a corresponding encounter identifier.

Referring back to FIG. 4, subsequent to step/operation 404, the example method 400 proceeds to step/operation 406. At step/operation 406, a computing entity (such as the vector computing entity 105 described above in connection with FIG. 1 and FIG. 2) may include means (such as the processing element 205 of the vector computing entity 105 described above in connection with FIG. 2) to generate one or more encounter vectors based at least in part on the one or more record data elements.

As described herein, the one or more record data elements may comprise or be associated with one or more record category identifiers and/or one or more record text descriptors. In some embodiments, the processing element may generate the one or more encounter vectors based at least in part on the one or more record category identifiers, details of which are described herein. In some embodiments, the processing element may generate the one or more encounter vectors based at least in part on the one or more record text descriptors, details of which are described herein. In some embodiments, the processing element may generate the one or more encounter vectors based at least in part on the one or more record category identifiers and the one or more record text descriptors, details of which are described herein.

In some embodiments, the one or more encounter vectors are associated with the one or more encounter identifiers. Continuing from the example above in connection with FIG. 6, the processing element may generate an encounter vector associated with the encounter identifier T1 based at least in part on the record data element 602 (and data and/or information associated with the record data element 602). The processing element may generate an encounter vector associated with the encounter identifier T2 based at least in part on the record data element 604 (and data and/or information associated with the record data element 604). The processing element may generate an encounter vector associated with the encounter identifier T3 based at least in part on the record data element 606 and the record data element 608 (and data and/or information associated with the record data element 606 and the record data element 608).

Continuing from the EMR example above, based at least in part on the first EMR associated with the first encounter identifier Jan. 1, 2021, the processing element may generate a first encounter vector associated with the first encounter identifier. Based at least in part on the second EMR associated with the second encounter identifier Feb. 1, 2021, the processing element may generate a second encounter vector associated with the second encounter identifier. Based at least in part on the third EMR and the fourth EMR associated with the third encounter identifier Apr. 1, 2021, the processing element may generate a third encounter vector associated with the third encounter identifier.

In some embodiments, the processing element may generate an encounter vector utilizing one or more natural language processing models. For example, the processing element may provide data and/or information associated with record data element(s) that is associated with an encounter identifier (e.g. associated with a visit) to a natural language processing model (also referred to as a "visit encoder"), and the natural language processing model may generate an encounter vector that is a vector representation associated with the encounter identifier (e.g. of that corresponding visit). In some embodiments, the natural language processing model may treat input data as a set having permutation symmetry, which may lead to a sequence of encounter vectors (e.g. visit representations) that each corresponds to a visit, details of which are described herein.

Referring back to FIG. 4, subsequent to step/operation 406, the example method 400 proceeds to step/operation 408. At step/operation 408, a computing entity (such as the vector computing entity 105 described above in connection with FIG. 1 and FIG. 2) may include means (such as the processing element 205 of the vector computing entity 105 described above in connection with FIG. 2) to generate a client vector based at least in part on the one or more encounter vectors.

In some embodiments, the processing element may generate the client vector at step/operation 408 based at least in part on the one or more encounter vectors generated at step/operation 406. In some embodiments, the processing element may generate the client vector at step/operation 408 based at least in part on the one or more encounter vectors and a natural language processing model. Additionally, or alternatively, the processing circuitry may use the natural language processing model at step/operation 406 to generate one or more encounter vectors.

In some embodiments, the natural language processing model at step/operation 406 and/or step/operation 408 is referred to as a "first natural language processing model" herein. Examples of the first natural language processing model may include, but not limited to, a transformer (for example, pre-trained using BERT) described above. In some embodiments, the client vector is associated with the client identifier. In some embodiments, the client vector is an individual historical representation of record data elements (as well as temporal information related to these record data elements) that are associated with the client.

Continuing from the EMR example above, in some embodiments, the processing element generates a client vector associated with the client/patient Adam. In some embodiments, to generate the client vector, the processing element uses a first natural language processing model (such as a transformer described above) to encode one or more encounter vectors associated with Adam. The sequence of encounter encounters, along with visit date information, form inputs to the first natural language processing model (also referred to as a "patient encoder"). In some embodiments, the first natural language processing model turns the entire sequence of encounters into a client vector that is a fixed length vector representation of the client/patient Adam.

In some embodiments, the client vector is combined with other data and/or information, such as, but not limited to, demographics data (such as age and gender) from profile data element(s) associated with the client identifier, details of which are described herein.

Referring back to FIG. 4, subsequent to step/operation 408, the example method 400 proceeds to step/operation

410. At step/operation 410, a computing entity (such as the vector computing entity 105 described above in connection with FIG. 1 and FIG. 2) may include means (such as the processing element 205 of the vector computing entity 105 described above in connection with FIG. 2) to generate a prediction data element based at least in part on the client vector and a machine learning model.

In some embodiments, the processing element may generate the prediction data element based at least in part on the client vector generated at step/operation 408 (and data and/or information from the profile data element associated with the client identifier). The processing element may provide the client vector (and data and/or information from the profile data element associated with the client identifier) as input to a machine learning model. The machine learning model may be pre-trained based at least in part on a training dataset, details of which are described herein. The machine learning model may generate the prediction data element as an output. In some embodiments, the prediction data element is associated with the client identifier.

In some embodiments, the prediction data element generated at step/operation 410 comprises one or more indicators. For example, the prediction data element may comprise a presence/absence determination indicator, a probability of occurrence indicator, a timespan to which the probability of occurrence applies indicator, a severity of occurrence indicator, and/or a timespan to which the severity applies indicator.

Continuing from the EMR example above, in some embodiments, the processing element may determine the relationship of the client/patient Adam with respect to his health state using a supervised learning model to classify the client vector of Adam generated at step/operation 408. In some embodiments, when classifying the relationship of Adam with respect to his health state, the supervised learning model may generate a prediction data element. In some embodiments, the prediction data element may comprise data and/or information predicting one or more of: a presence/absence determination, a probability of occurrence; a timespan to which the probability applies; a severity of occurrence; or a timespan to which the severity applies.

For example, the prediction data element may comprise a "presence/absence determination" on whether Adam is estimated to have rheumatoid arthritis. Additionally, or alternatively, the prediction data element may comprise a "probability of occurrence" on an estimated probability that rheumatoid arthritis has occurred or will likely occur in Adam. Additionally, or alternatively, the prediction data element may comprise a "timespan to which the probability applies" corresponding to an estimated timespan to which the estimated probability of rheumatoid arthritis applies. Additionally, or alternatively, the prediction data element may comprise a "severity of occurrence" on the estimated severity of rheumatoid arthritis that has occurred or is estimated to have occurred or will likely occur in Adam. Additionally, or alternatively, the prediction data element may comprise a "timespan to which the severity applies" corresponding to an estimated timespan to which the estimated severity of rheumatoid arthritis applies.

Referring back to FIG. 4, subsequent to step/operation 410, the example method 400 proceeds to step/operation 412. At step/operation 412, a computing entity (such as the vector computing entity 105 described above in connection with FIG. 1 and FIG. 2) may include means (such as the processing element 205 of the vector computing entity 105 described above in connection with FIG. 2) to perform at least one data operation based at least in part on the prediction data element generated at step/operation 410.

In some embodiments, the processing element may transmit the prediction data element to a client computing entity. In some embodiments, the processing element may render the prediction data element on a user interface that is on a display of the client computing entity. Additionally, or alternatively, the processing element may perform one or more other data operations based at least in part on the prediction data element generated at step/operation 410.

Referring back to FIG. 4, subsequent to step/operation 412, the example method 400 proceeds to step/operation 414 and ends.

d. Exemplary Generation of Encounter Vectors

In various embodiments of the present disclosure, a computing entity (such as the vector computing entity 105 described above in connection with FIG. 1 and FIG. 2) may implement various processing techniques (including, but not limited to, one or more encoding and/or embedding techniques) to generate one or more encounter vectors (for example, but not limited to, in connection with step/operation 406 of FIG. 4 above). Referring now to FIG. 5 to FIG. 14, various examples associated with generating one or more encounter vectors are illustrated.

As described herein, the one or more record data elements may comprise or be associated with one or more record category identifiers and one or more record text descriptors. Accordingly, FIG. 7 to FIG. 12 illustrate examples of generating one or more encounter vectors based at least in part on the one or more record category identifiers and one or more record text descriptors associated with the one or more record data elements.

Figure 7:
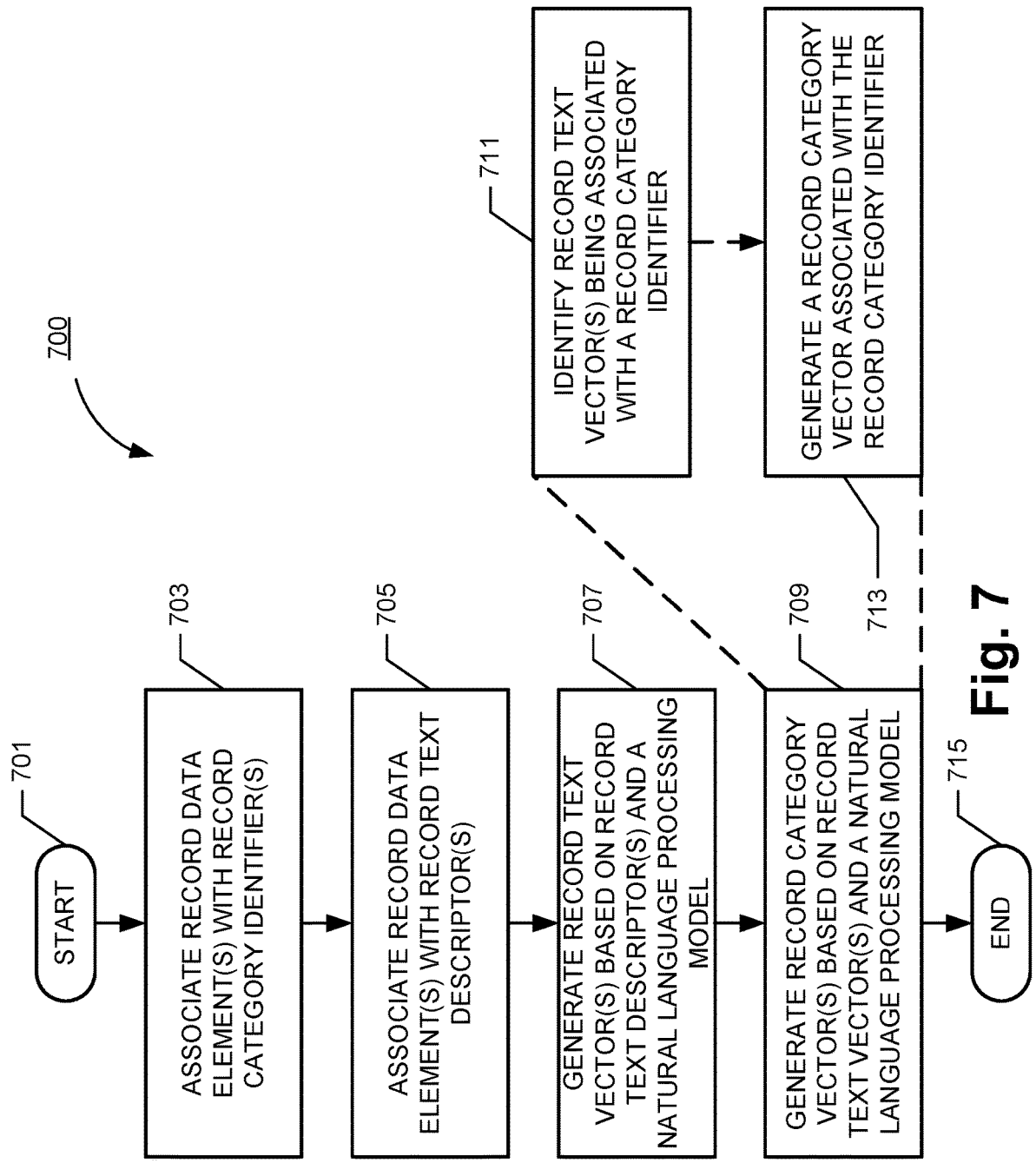

Referring now to FIG. 7, an example method 700 in accordance with embodiments of the present disclosure is illustrated. In particular, the example method 700 illustrates an example method of generating one or more record text vectors and one or more record category vectors.

As shown in FIG. 7, the example method 700 starts at step/operation 701. Subsequent to step/operation 701, the example method 700 proceeds to step/operation 703. At step/operation 703, a computing entity (such as the vector computing entity 105 described above in connection with FIG. 1 and FIG. 2) may include means (such as the processing element 205 of the vector computing entity 105 described above in connection with FIG. 2) to associate one or more record data elements with one or more record category identifiers.

Figure 8:
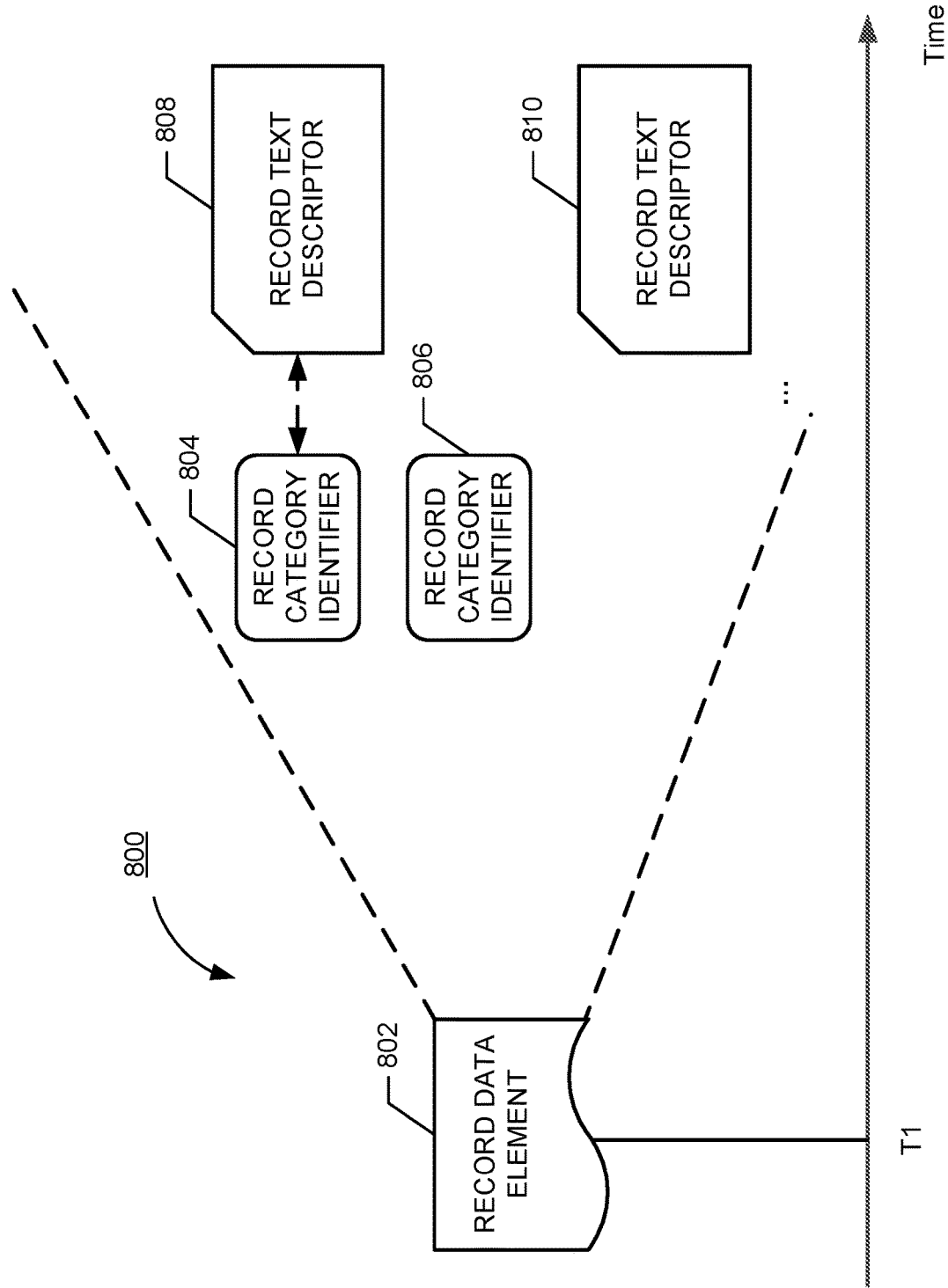

As described above, an example record data element can be associated with one or more record category identifiers. Referring now to FIG. 8, an example diagram 800 is illustrated. The example diagram 800 illustrates a record data element 802, which may be associated with a client identifier and an counter identifier T1, similar to those described above.

In the example shown in FIG. 8, the processing element may associate the record category identifier 804 and the record category identifier 806 with the record data element 802. For example, the processing element may determine that the record data element 802 comprises at least the record category identifier 804 and the record category identifier 806, and may establish a data association between the record category identifier 804 and the record data element 802, and may establish a data association between the record category identifier 806 and the record data element 802.

For example, the record data element 802 may be in the form of an EMR associated with a client/patient identifier Adam and an encounter identifier T1 of Jan. 1, 2021. The processing element may determine that the EMR comprises an ICD code (which may correspond to the record category identifier 804) that is related to a diagnosis of disease associated with Adam on Jan. 1, 2021, as well as a CPT code (which may correspond to the record category identifier 806) that is related to a procedure conducted on Adam on Jan. 1, 2021. As such, the processing element may establish a data connection between the EMR and the ICD code, as well as a data connection between the EMR and the CPT code.

As described above, the respective record categories may comprise, but not limited to, at least one of: a diagnosis, a procedure, a pharmaceutical, a lab test, and/or a lab test result. In some embodiments, one or more record category identifiers associated with the one or more record data elements at step/operation 703 comprise at least one of: a diagnosis identifier, a procedure identifier, a pharmaceutical identifier, a lab test identifier, and/or a lab test result identifier.

For example, the one or more record category identifiers associated with the one or more record data elements at step/operation 703 may comprise one or more CPT codes. Additionally, or alternatively, the one or more record category identifiers associated with the one or more record data elements at step/operation 703 may comprise one or more pharmaceutical claims submitted by one or more pharmacies. Additionally, or alternatively, the one or more record category identifiers associated with the one or more record data elements at step/operation 703 may comprise one or more types of lab tests. Additionally, or alternatively, the one or more record category identifiers associated with the one or more record data elements at step/operation 703 may comprise one or more lab test results.

Referring back to FIG. 7, subsequent to step/operation 703, the example method 700 proceeds to step/operation 705. At step/operation 705, a computing entity (such as the vector computing entity 105 described above in connection with FIG. 1 and FIG. 2) may include means (such as the processing element 205 of the vector computing entity 105 described above in connection with FIG. 2) to associate one or more record data elements with one or more record text descriptors.

As described above, an example record data element can be associated with one or more record text descriptors. Referring now to FIG. 8, the processing element may associate the record text descriptor 808 and the record text descriptor 810 with the record data element 802. For example, the processing element may determine that the record data element 802 comprises at least the record text descriptor 808 and the record text descriptor 810, and may establish a data association between the record text descriptor 808 and the record data element 802, and may establish a data association between the record text descriptor 810 and the record data element 802.

Continuing from the EMR example above, the processing element may determine that the EMR comprises an ICD code (which may correspond to the record category identifier 804). The processing element may determine the corresponding text description of the ICD code as the record text descriptor 808, and may establish a data connection between the EMR and the text description of the ICD code.

Additionally, or alternatively, the processing element may identify record text descriptors through other means, and may associate such record text descriptors with the record data element.

For example, the processing element may establish a data association between textual data associated with encounter and the corresponding record data element. Continuing from the EMR example above, the processing element may establish a data association between textual data (such as, but not limited to, doctor's notes/comments, a description of the patient's symptoms, etc.) associated with the encounter identifier (for example, a doctor's visit) and the corresponding record data element (for example, the EMR corresponding to the doctor's visit).

Additionally, or alternatively, the processing element may query a network database based at least in part on the one or more record data elements to identify record text descriptors, and may associate the record text descriptor with one or more record data elements. For example, the processing element may conduct an automated network search using at least one of one or more record data elements as a search term, and may associate the search results with the corresponding at least one of one or more record data elements. Continuing from the EMR example above, the processing element may perform an automated Internet search for the diagnosis, the treatment, the procedure, and/or the drug associated with the EMR, may generate a record text descriptor based at least in part on the search results, and may associate the record text descriptor with the EMR.

Referring back to FIG. 7, subsequent to step/operation 705, the example method 700 proceeds to step/operation 707. At step/operation 707, a computing entity (such as the vector computing entity 105 described above in connection with FIG. 1 and FIG. 2) may include means (such as the processing element 205 of the vector computing entity 105 described above in connection with FIG. 2) to generate one or more record text vectors based at least on record text descriptor(s) and a natural language processing model.

For example, the processing element may generate one or more record text vectors based least in part on one or more record text descriptors (which are associated with the record data elements at step/operation 705) and the natural language processing model. As an example, the processing element may provide a record text descriptor from the one or more record text descriptors as an input to the natural language processing model, and the natural language processing model may generate a corresponding record text vector based at least in part on the record text descriptor.

In the present disclosure, the natural language processing model at step/operation 707 is also referred to as "a second natural language processing model" herein. In some embodiments, the second natural language processing model is configured to perform one or more of pre-computed embeddings, learned embeddings, or relative embedding to generate a corresponding record text vector. For example, when performing pre-computed embedding, the second natural language processing model may retrieve word embeddings that have been pre-computed and stored in a database. Additionally, or alternatively, when performing learned embeddings, the second natural language processing model may perform machine learning techniques to generate one or more embeddings. Additionally, or alternatively, when performing relative embedding, the second natural language processing model may calculate relative distances between each relevant word/phrase to embed/generate one or more record text vectors. Additionally, or alternatively, the second natural language processing model may generate one or more record text vectors through other embedding mechanisms and/or techniques.

In some embodiments, the second natural language processing model may be pre-trained using BERT and text data including, but not limited to, biomedical domain text data and/or general domain text data. As such, the second natural language processing model may interpret the descriptions associated with the record text descriptors to generate the one or more record text vectors.

Continuing from the EMR example above, the processing element may provide the one or more record text descriptors associated with a record data element to a natural language processing model, such as, but not limited to, a transformer. In this example, the transformer may generate one or more record text vectors based at least in part on the one or more record text descriptors.

For example, the processing element may extract the ICD code from the record data element, receive a record text descriptor associated with the ICD code, and provide the record text descriptor as an input to the transformer. The transformer may generate a corresponding record text vector. Similarly, the processing element may provide each of the record text descriptor (e.g. those associated with the ICD code, PCT code, etc.) associated with a record data element to the transformer, and the transformer may generate a record text vector for each of the record text descriptor. As such, the processing element may generate one or more record text vectors based at least in part on the one or more record text descriptors associated with the ICD code, may generate one or more record text vectors based at least in part on the one or more record text descriptors associated with the PCT code, and/or the like.

Referring back to FIG. 7, subsequent to step/operation 707, the example method 700 proceeds to step/operation 709. At step/operation 709, a computing entity (such as the vector computing entity 105 described above in connection with FIG. 1 and FIG. 2) may include means (such as the processing element 205 of the vector computing entity 105 described above in connection with FIG. 2) to generate record category vector(s) based at least in part on record text vector(s) and a natural language processing model.

For example, the processing element may generate one or more record category vectors associated with the one or more record category identifiers (which are associated with the record data elements at step/operation 703) based at least in part on the one or more record text vectors (which are generated at step/operation 707) and a natural language processing model. In the present disclosure, the natural language processing model at step/operation 709 (and/or step/operation 713 described herein) is also referred to as a "third natural language processing model" herein.

In some embodiments, the third natural language processing model is configured to perform one or more of pre-computed embeddings, learned embeddings, or relative embedding to generate a corresponding record category vector. For example, when performing pre-computed embedding, the third natural language processing model may retrieve word embeddings that have been pre-computed and stored in a database. Additionally, or alternatively, when performing learned embeddings, the third natural language processing model may perform machine learning techniques to generate one or more embeddings. Additionally, or alternatively, when performing relative embedding, the third natural language processing model may calculate relative distances between each relevant word/phrase to embed/generate one or more record category vectors. Additionally, or alternatively, the third natural language processing model may generate one or more record category vectors through other embedding mechanisms and/or techniques.

In some embodiments, the third natural language processing model may be pre-trained using BERT and text data including, but not limited to, biomedical domain text data and/or general domain text data. As such, the third natural language processing model may interpret the one or more record text vectors to generate one or more record category vectors.

In accordance with various embodiments of the present disclosure, step/operation 709 of FIG. 7 may be carried out by the processing element in a variety of different ways. For example, in some embodiments, step/operation 709 may comprise step/operation 711 and step/operation 713 as shown in FIG. 7, which illustrate generating a corresponding record category vector (of the one or more record category vectors) that is associated with a corresponding record category identifier (of the one or more record category identifiers) in accordance with various embodiments of the present disclosure.

At step/operation 711, a computing entity (such as the vector computing entity 105 described above in connection with FIG. 1 and FIG. 2) may include means (such as the processing element 205 of the vector computing entity 105 described above in connection with FIG. 2) to identify record text vector(s) being associated with a record category identifier.

For example, the processing element may identify at least one record text vector (from the one or more record text vectors generated at step/operation 707) being associated with the corresponding record category identifier (of the one or more record category identifiers).

Continuing from the EMR example above, the EMR may comprise an ICD code (e.g. a record category identifier) that is related to a diagnosis of disease associated with Adam on Jan. 1, 2021, as well as a CPT code (e.g. a record category identifier) that is related to a procedure conducted on Adam on Jan. 1, 2021. As described above in connection with at least step/operation 707, the processing element may generate one or more record text vectors based at least in part on the one or more record text descriptors associated with the ICD code, and these record text vectors are associated with the corresponding ICD code. The processing element may also generate one or more record text vectors based at least in part on the one or more record text descriptors associated with the PCT code, and these record text vectors are associated with the corresponding PCT code. In this example, at step/operation 711, the processing element may identify the one or more record text vectors associated with the ICD code. Similarly, the processing element may identify one or more record text vectors associated with each of the other record category identifiers (e.g. each PCT code, etc.).

Referring back to FIG. 7, subsequent to step/operation 711, the example method 700 proceeds to step/operation 713. At step/operation 713, a computing entity (such as the vector computing entity 105 described above in connection with FIG. 1 and FIG. 2) may include means (such as the processing element 205 of the vector computing entity 105 described above in connection with FIG. 2) to generate a record category vector associated with the record category identifier.

In some embodiments, the processing element generates a corresponding record category vector associated with a corresponding record category identifier based at least in part on the at least one record text vector associated with the corresponding record category identifier (identified at step/operation 711) and a natural language processing model (e.g. a third natural language processing model).

Continuing from the EMR example above, the processing element may generate a record category vector corresponding to the ICD code (e.g. a record category identifier) based at least in part on at least one the record text vector associated with the ICD code that has been identified at step/operation 711. Similarly, the processing element may generate a corresponding record category vector for each of the other record category identifiers (e.g. each PCT code, etc.) associated with the record data element based at least in part on at least one the record text vector associated with the corresponding record category identifier that has been identified at step/operation 711.

In some embodiments, the processing element may select the third natural language processing model from a plurality of natural language processing models based at least in part on the corresponding record category identifier. Continuing from the EMR example above, based at least in part on the record category identifier indicating an ICD code, the processing element may select a natural language processing model corresponding to the ICD code to generate the record category vector associated with the ICD code. As such, the plurality of natural language processing models may comprise one or more natural language processing models for generating a record category vector associated with the ICD code, one or more natural language processing models for generating a record category vector associated with the PCT code, and/or the like.

In some embodiments, at least one of the first natural language processing model (e.g. associated with at least step/operation 408 of FIG. 4), the second natural language processing model (e.g. associated with at least step/operation 707 of FIG. 7), and/or the third natural language processing model (associated with at least step/operation 709 and/or step/operation 713 of FIG. 7) is pretrained using BERT.

Referring back to FIG. 7, subsequent to step/operation 709 or step/operation 713, the example method 700 proceeds to step/operation 715 and ends.

Figure 9:
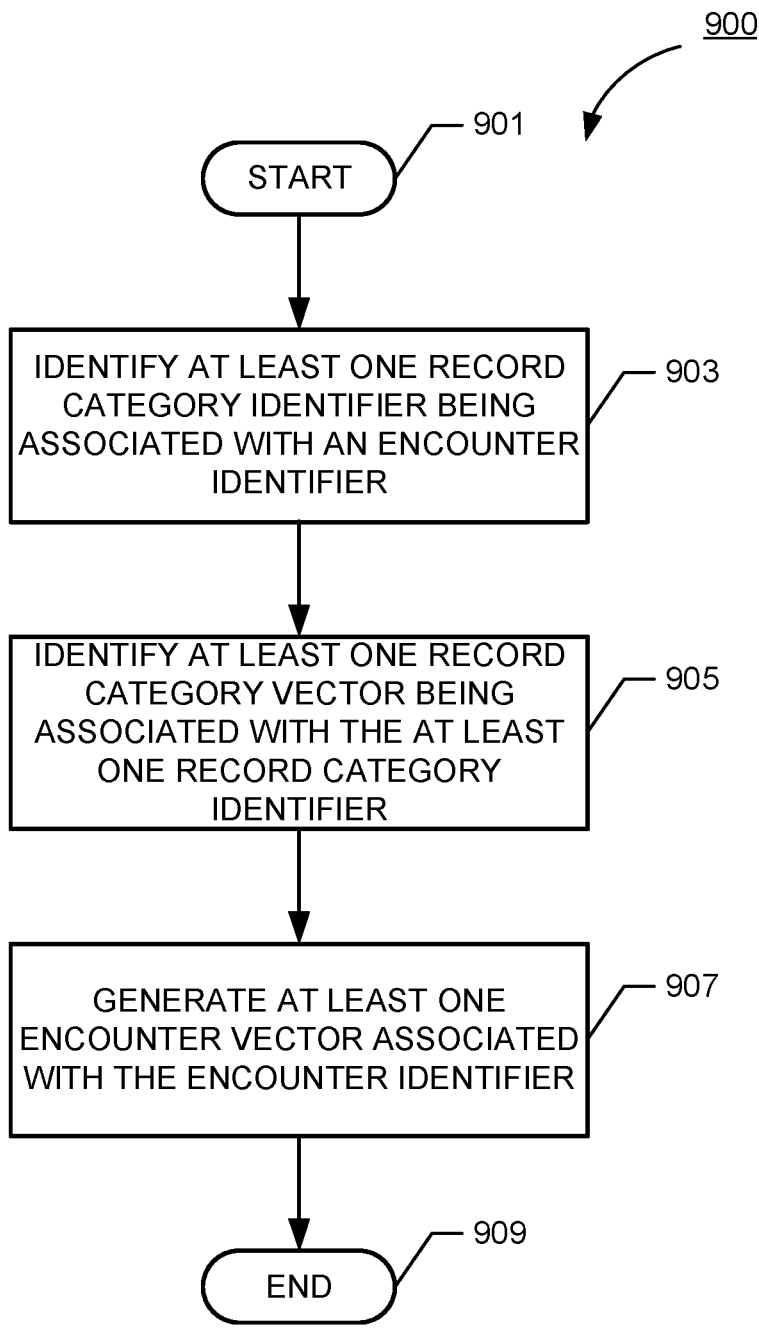

Referring now to FIG. 9, an example method 900 illustrates an example method of generating at least one encounter vector in accordance with embodiments of the present disclosure.

As shown in FIG. 9, the example method 900 starts at step/operation 901. Subsequent to step/operation 901, the example method 900 proceeds to step/operation 903. At step/operation 903, a computing entity (such as the vector computing entity 105 described above in connection with FIG. 1 and FIG. 2) may include means (such as the processing element 205 of the vector computing entity 105 described above in connection with FIG. 2) to identify at least one record category identifier being associated with an encounter identifier.

As described above in connection with at least FIG. 4 and FIG. 7, each record data element may be associated with an encounter identifier and may comprise or be associated with one or more record category identifiers. As such, based at least in part on the one or more record data elements, the processing element may identify at least one record category identifier (from one or more record category identifiers) being associated with an encounter identifier (of the one or more encounter identifiers).

Continuing from the EMR example above, the EMR may comprise an ICD code (e.g. a record category identifier) that is related to a diagnosis of disease associated with Adam on Jan. 1, 2021 (e.g. an encounter identifier), as well as a CPT code (e.g. a record category identifier) that is related to a procedure conducted on Adam on Jan. 1, 2021 (e.g. an encounter identifier). In such an example, the ICD code and the CPT code (e.g. record category identifiers) are associated with the encounter identifier Jan. 1, 2021.

Referring back to FIG. 9, subsequent to step/operation 903, the example method 900 proceeds to step/operation 905. At step/operation 905, a computing entity (such as the vector computing entity 105 described above in connection with FIG. 1 and FIG. 2) may include means (such as the processing element 205 of the vector computing entity 105 described above in connection with FIG. 2) to identify at least one record category vector being associated with the at least one record category identifier identified at step/operation 903.

As described above in connection with at least FIG. 7, the processing element may generate one or more record category vectors, each corresponding to a record category identifier associated with the record data elements. At step/operation 905 of FIG. 9, the processing element may identify at least one record category vector (from the one or more record category generated based at least in part on at lease FIG. 5) being associated with the at least one record category identifier that has been identified at step/operation 903 of FIG. 9.

Continuing from the EMR example above, the processing element may identify a first record category vector associated with the ICD code and a second record category vector associated with the CPT code. In some embodiments, the first record category vector and the second record category vector are generated by the processing element in accordance with various examples described herein.

Referring back to FIG. 9, subsequent to step/operation 905, the example method 900 proceeds to step/operation 907. At step/operation 907, a computing entity (such as the vector computing entity 105 described above in connection with FIG. 1 and FIG. 2) may include means (such as the processing element 205 of the vector computing entity 105 described above in connection with FIG. 2) to generate at least one encounter vector associated with the encounter identifier.

In some embodiments, the processing element may generate at least one encounter vector associated with the encounter identifier based at least in part on the at least one record category vector identified at step/operation 905. For example, the at least one record category identifier at step/operation 905 is associated with at least one record category identifier, which in turn is associated with the encounter identifier as identified at step/operation 903. As such, the processing element may generate the at least one encounter vector based at least in part on the at least one record category vector that is associated with the encounter identifier, and the resultant encounter vector is associated with the encounter identifier.

Additionally, or alternatively, the processing element may identify all record category vector(s) associated with a particular encounter identifier, and may generate a corresponding encounter vector associated with the particular encounter identifier based at least in part on the record category vector(s).

Figure 10:
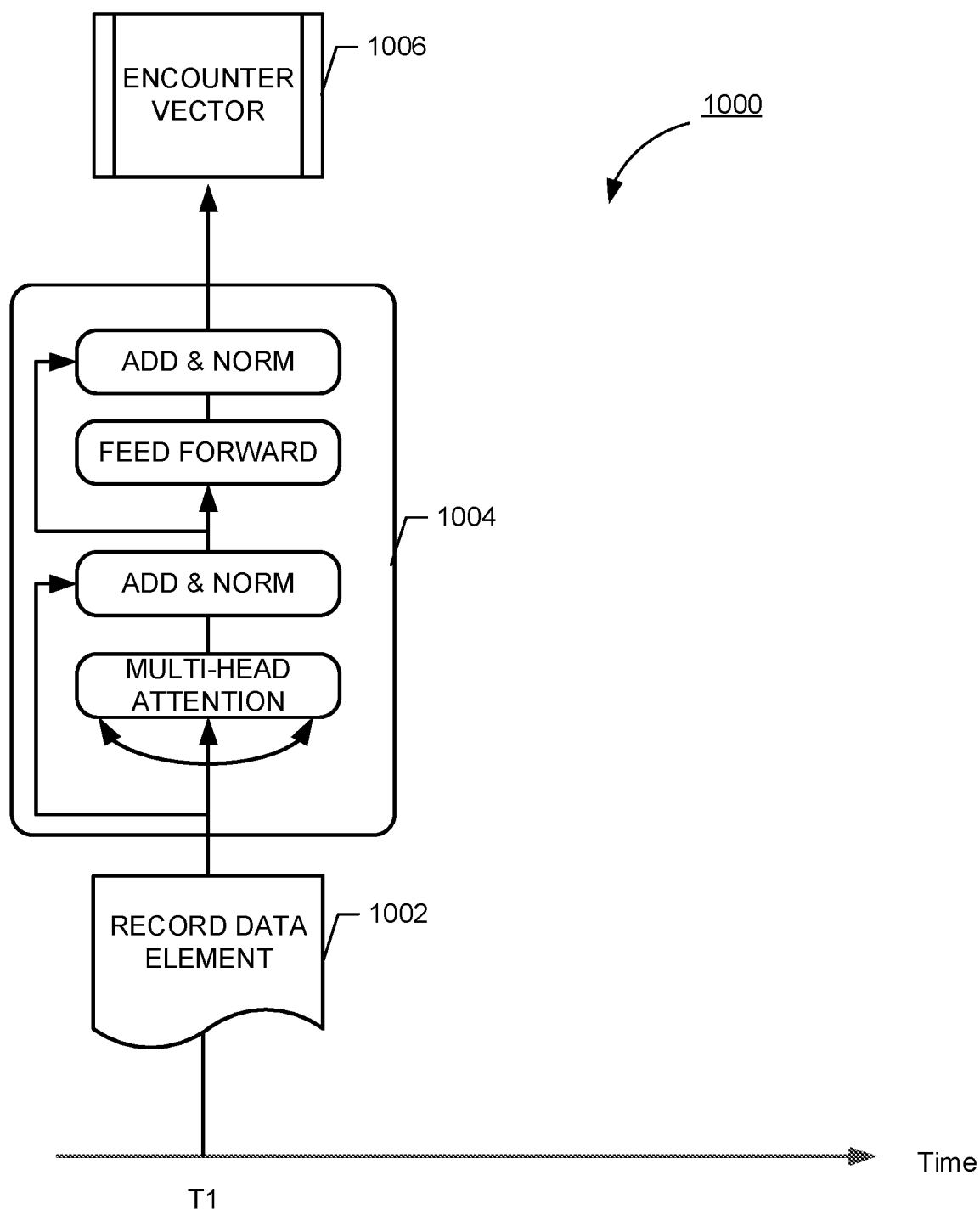

Referring now to FIG. 10, an example diagram 1000 is illustrated. In particular, the example diagram 1000 illustrates an example method of generating at least one encounter vector.

In the example shown in FIG. 10, the record data element 1002 is associated with the encounter identifier T1 and a client identifier. As described above (for example, in connection with at least FIG. 8), the record data element 1002 may comprise or be associated with one or more record category identifiers and one or more record text descriptors. In some embodiments, the processing element may provide the one or more record text descriptors to the natural language processing model 1004 to generate one or more record text vectors, and may in turn provide the one or more record text vectors to the natural language processing model 1004 to generate one or more record category vectors, similar to those described above.

In various embodiments of the present disclosure, an example natural language processing model may comprise one or more "layers," where each layer of the natural language processing model is configured to perform one or more natural language processing tasks. In the example shown in FIG. 10, the example natural language processing model 1004 comprises a multi-head attention layer, a feed forward layer, and one or more add & norm layers. In some embodiments, the multi-head attention layer may utilize a multi-head attention mechanism to perform transformation on the input data to generate one or more attention vectors. In some embodiments, the feed forward layer may transform the attention vectors into another form that is suitable for the next layer/transformer. In some embodiments, an add & norm layer may follow the multi-head attention layer, and an add & norm layer may follow the feed forward layer. In some embodiments, each of the add & norm layers may normalize the output from the prior layer.

While the description above provides an example of a natural language processing model, it is noted that the scope of the present disclosure is not limited to the description above. In some examples, an example natural language processing model may comprise one or more additional and/or alternative layers, and/or may be in one or more additional and/or alternative forms.

Referring back to FIG. 10, in some embodiments, if there is only one record category vector associated with the encounter identifier, the processing element may assign the record category vector as the encounter vector 1006. If there are more than one record category vector associated with the encounter identifier, the processing element may combine these record category vectors based at least in part on summation, multiplication, artificial neural networks, and/or the like to generate the encounter vector 1006, details of which are described herein.

Continuing from the EMR example above, as described above in connection with step/operation 905, the processing element may identify a first record category vector associated with the ICD code and the second record category vector associated with the CPT code, and the ICD code and the CPT code are associated with the encounter identifier Jan. 1, 2021 as identified at step/operation 903. At step/operation 907, the processing element may generate an encounter vector associated with the encounter identifier Jan. 1, 2021 based at least in part on the first record category vector associated with the ICD code and the second record category vector associated with the CPT code.

Referring back to FIG. 9, subsequent to step/operation 907, the example method 900 proceeds to step/operation 909 and ends.

Figure 11:
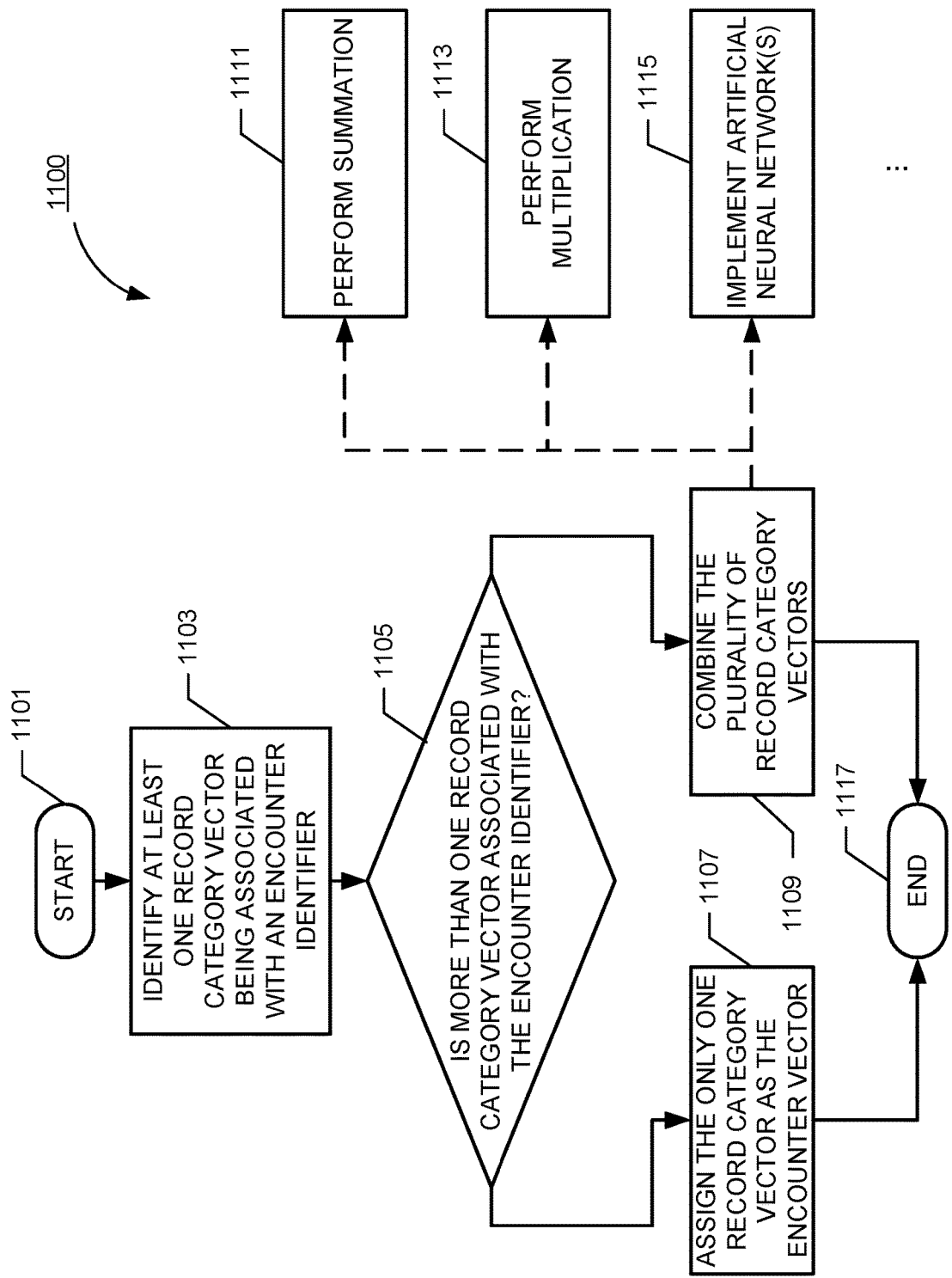

Referring now to FIG. 11, an example method 1100 illustrates an example method of generating an example encounter vector based at least in part on the number of associated record category vector(s) in accordance with embodiments of the present disclosure.

As shown in FIG. 11, the example method 1100 starts at step/operation 1101. Subsequent to step/operation 1101, the example method 1100 proceeds to step/operation 1103. At step/operation 1103, a computing entity (such as the vector computing entity 105 described above in connection with FIG. 1 and FIG. 2) may include means (such as the processing element 205 of the vector computing entity 105 described above in connection with FIG. 2) to identify at least one record category vector being associated with an encounter identifier.

For example, as described above in connection with at least FIG. 9, the processing element may generate one or more record category vectors, each associated with a corresponding record category identifier. In some embodiments, each record category identifier is associated with a record data element, which in turn is associated with an encounter identifier. As such, the processing element may identify at least one record category vector being associated with an encounter identifier based at least in part on the one or more record data elements and/or one or more record category identifiers.

Continuing from the EMR example above, the EMR may comprise an ICD code (e.g. a record category identifier) that is related to a diagnosis of disease associated with Adam on Jan. 1, 2021 (e.g. an encounter identifier), as well as a CPT code (e.g. a record category identifier) that is related to a procedure conducted on Adam on Jan. 1, 2021 (e.g. an encounter identifier). As described above in connection with at least step/operation 905 of FIG. 9, the processing element may identify a first record category vector associated with the ICD code and a second record category vector associated with the CPT code. In this example, the processing element may identify at least the first record category vector and the second record category vector as being associated with the encounter identifier Jan. 1, 2021.

Referring back to FIG. 11, subsequent to step/operation 1103, the example method 1100 proceeds to step/operation 1105. At step/operation 1105, a computing entity (such as the vector computing entity 105 described above in connection with FIG. 1 and FIG. 2) may include means (such as the processing element 205 of the vector computing entity 105 described above in connection with FIG. 2) to determine whether more than one record category vector is associated with the encounter identifier.

If, at step/operation 1105, the computing entity determines that no more than one record category vector is associated with the encounter vector, the example method 1100 proceeds to step/operation 1107. At step/operation 1107, a computing entity (such as the vector computing entity 105 described above in connection with FIG. 1 and FIG. 2) may include means (such as the processing element 205 of the vector computing entity 105 described above in connection with FIG. 2) to assign the only one record category vector as the encounter vector.

For example, in response to determining that only one record category vector is associated with the at least one record category identifier, the processing element assigns the only one record category vector as the encounter vector.

Continuing from the EMR example above, if the processing element determines that only a third record category vector is associated with an encounter identifier of Feb. 1, 2021, the processing element assigns the third record category vector as the encounter vector associated with the encounter identifier of Feb. 1, 2021.

Referring back to FIG. 11, subsequent to step/operation 1107, the example method 1100 proceeds to step/operation 1117 and ends.

If, at step/operation 1105, the computing entity determines that more than one record category vector is associated with the encounter vector, the example method 1100 proceeds to step/operation 1109. At step/operation 1109, a computing entity (such as the vector computing entity 105 described above in connection with FIG. 1 and FIG. 2) may include means (such as the processing element 205 of the vector computing entity 105 described above in connection with FIG. 2) to combine the plurality of record category vectors to generate at least one encounter vector.

In some embodiments, in response to determining that a plurality of record category vectors are associated with the at least one record category identifier at step/operation 1105, the processing element may generate the at least one encounter vector based at least in part on the plurality of record category vectors at step/operation 1109. In accordance with various embodiments of the present disclosure, step/operation 1109 may be carried out by the processing element in a variety of different ways, including, but not limited to, one or more of performing summation on the plurality of record category vectors (step/operation 1111), performing multiplication on the plurality of record category vectors (step/operation 1113), and/or implementing artificial neural networks on the plurality of record category vectors (step/operation 1115).

For example, at step/operation 1111, to combine the plurality of record category vectors through performing summation, the processing element may add the plurality of record category vectors together, and the result sum of the addition is the encounter vector.

Additionally, or alternatively, at step/operation 1113, to combine the plurality of record category vectors through performing multiplication, the processing element may multiply the plurality of record category vectors, and the result of the multiplication is the encounter vector.

Additionally, or alternatively, at step/operation 1115, to combine the plurality of record category vectors through implementing artificial neural network(s), the processing element may provide each of the plurality of record category vectors to the input layer of an artificial neural network. In some embodiments, the artificial neural network has been trained to generate an encounter vector based at least in part on the record category vectors. As such, the artificial neural network may generate an encounter vector based at least in part on the plurality of record category vectors at step/operation 1115.

In some embodiments, the processing element may generate an encounter vector based at least in part on step/operation 1111 alone, step/operation 1113 alone, or step/operation 1115 alone. In some embodiments, the processing element may generate an encounter vector based at least in part on a combination of step/operation 1111, and/or step/operation 1113, and/or step/operation 1115.

While the description above provides some examples of combining multiple record category vectors to generate an encounter vector, it is noted that the scope of the present disclosure is not limited to the description above. Additionally, or alternatively, an example method may combine multiple record category vectors to generate an encounter vector based at least in part on other methods.

Figure 12:
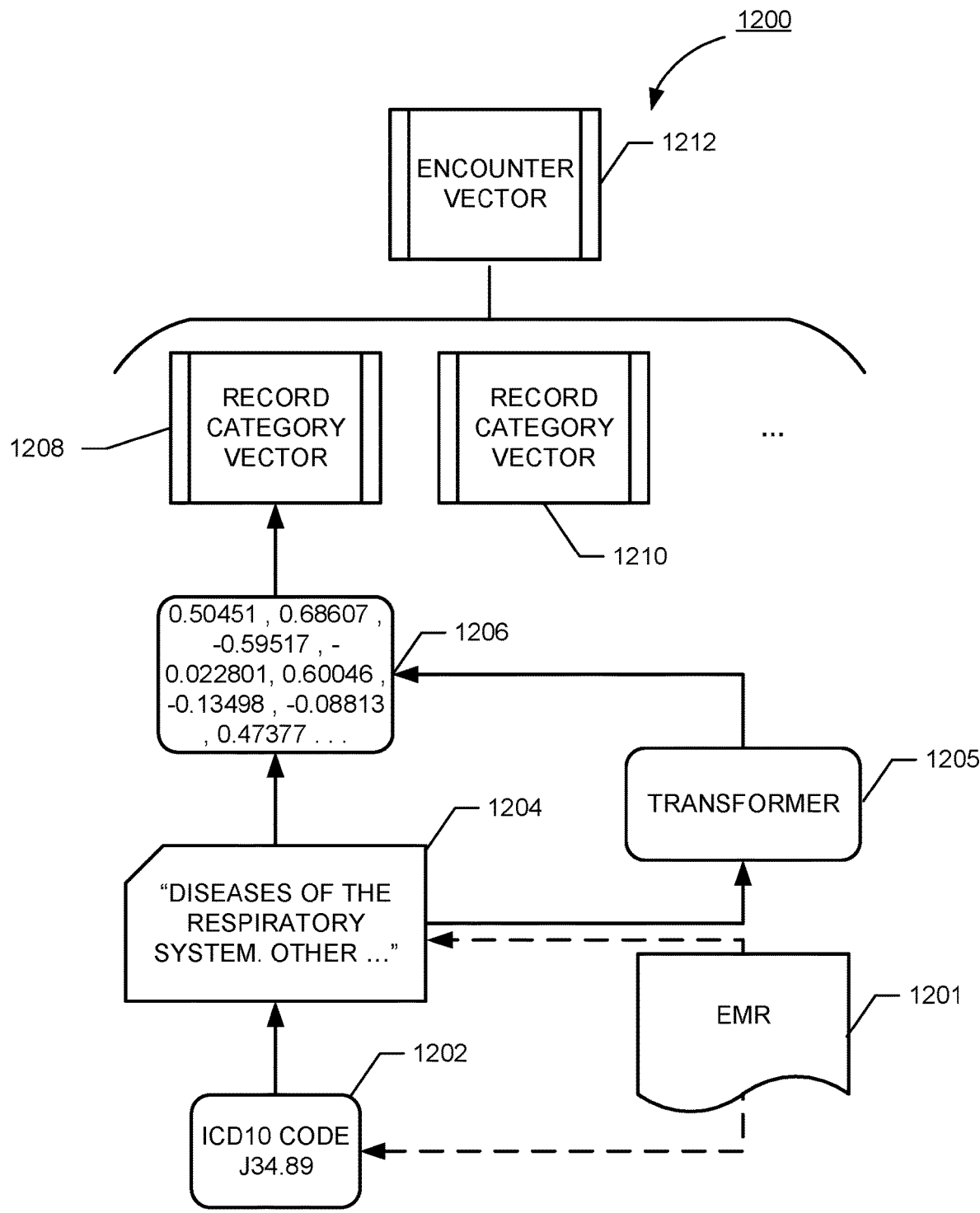

Referring now to FIG. 12, an example diagram 1200 is illustrated. In particular, the example diagram 1200 illustrates an example of combining multiple record category vectors to generate an encounter vector.

In the example as shown in FIG. 12, a processing element may determine that an example record data element 1201 is associated with a record category identifier 1202, which is in the form of an ICD code. The processing element may also determine that the example record data element 1201 is associated with a record text descriptor 1204, which may describe the ICD code. In some embodiments, the processing element may retrieve/identify the example record data element 1201, the record category identifier 1202, and/or the record text descriptor 1204 based at least in part on one or more example methods described herein. In some embodiments, the association between the record category identifier 1202 and the record data element 1201, as well as the association between the record text descriptor 1204 and the record data element 1201, may be determined by the processing element based at least in part on one or more example methods described herein.

In some embodiments, the processing element may provide record text descriptor 1204 to a natural language processing model 1205 (including, but not limited to, a transformer such as a BERT model that has been pre-trained (e.g. a Bio-BERT model)). In some embodiments, the processing element generates a record text vector 1206 based at least in part on the record text descriptor 1204 and using the natural language processing model 1205. In some embodiments, the processing element may generate a record category vector 1208 based at least in part on one or more record text vectors (such as, but not limited to, the record text vector 1206). In some embodiments, the processing element may generate an encounter identifier 1212 based at least in part on one or more record category vectors associated with the encounter (such as, but not limited to, the record category vector 1208, the record category vector 1210).

While the description above provides an example of generating an encounter vector, it is noted that the scope of the present disclosure is not limited to the description above. In some examples, an example method may comprise or implement one or more additional and/or alternative mechanisms and/or techniques to generate an encounter identifier. For example, the processing element may implement one or more neural networks, which may facilitate in using high-dimensional vectorized embedding to represent text data. Additionally, or alternatively, the processing element may implement one-hot encoding.

Referring back to FIG. 11, subsequent to step/operation 1109, the example method 1100 proceeds to step/operation 1117 and ends.

Accordingly, in accordance with examples of the present disclosure, a processing element may generate one or more encounter vectors representing a given visit. Each data element associated with a visit (identified as being associated with a particular patient, provider, and date) can be classified according to the record category. In some embodiments, each data element may also be associated with some descriptive text specific to the data element. For example, text associated with the ICD diagnosis code, CPT treatment code, or standard drug references, as appropriate for the data element, are used to generate the encounter vector. Additionally, or alternatively, other sources of meaningful text could be used. For example, text generated from an automated Internet search for the diagnosis, treatment, or drug could be used to provide a similar effect. The text associated with each data element is then encoded with a transformer to yield a text vector. All the text vectors associated with a particular record category (and the given visit) are then collectively encoded using a transformer to yield a record category vector associated with the record category. If there is only one record category for the visit, the record category may be treated as the encounter vector. If there is more than one record category associated with the visit, the information from the encoded record categories can be, for example but not limited to, multiplied to yield the encounter vector. Additionally, or alternatively, other viable methods of combining the encoded record categories may include, but not limited to, operations such as summation or one or more neural networks.

In accordance with various embodiments of the present disclosure, when generating the encounter vector (with respect to one or more data elements associated with a visit), the processing element may associate the one or more data elements with respective record categories (each a record category); associate the one or more data elements with respective texts (each a text); and encode each of the respective texts with a second transformer to yield respective text vectors (each a text vector). In some embodiments, for each record category associated with the visit, the processing element may generate a record category vector using a third transformer to encode one or more text vectors, each of the one or more text vectors associated with each record category. In some embodiments, if only one record category vector is associated with the visit, the processing element may generate the encounter vector using the only one record category vector. In some embodiments, if multiple record category vectors are associated with the visit, the processing element may generate the encounter vector using a combination of the multiple record category vectors.

As described herein, the one or more record data elements may comprise or be associated with one or more record text descriptors. Accordingly, FIG. 13 illustrates examples of generating one or more encounter vectors based at least in part on the one or more record text descriptors associated with the one or more record data elements (without using record category identifiers).

Figure 13:
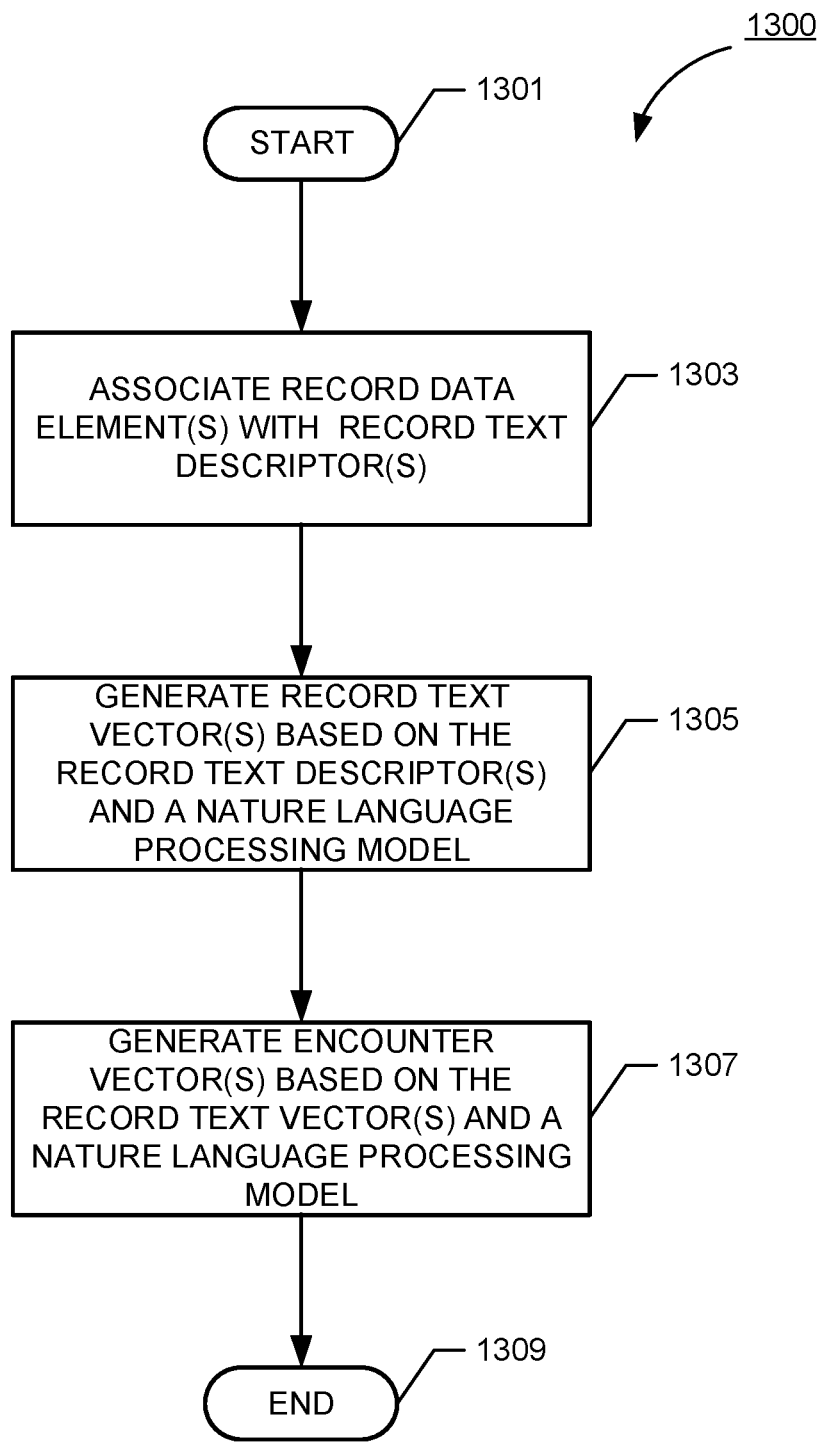

Referring now to FIG. 13, the example method 1300 starts at step/operation 1301. Subsequent to step/operation 1301, the example method 1300 proceeds to step/operation 1303. At step/operation 1303, a computing entity (such as the vector computing entity 105 described above in connection with FIG. 1 and FIG. 2) may include means (such as the processing element 205 of the vector computing entity 105 described above in connection with FIG. 2) to associate record data element(s) with record text descriptor(s).

In some embodiments, the processing element may associate one or more record data elements with one or more record text descriptors, similar to those described above in connection with at least step/operation 705 of FIG. 7.

For example, the processing element may identify a text description of symptoms associated with a patient in an EMR, and may establish a data connection between the EMR (e.g. the record data element) and the text description of symptoms (e.g. the record text descriptor). Additionally, or alternatively, the processing element may determine record text descriptors through other means, similar to those described above.

Referring back to FIG. 13, subsequent to step/operation 1303, the example method 1300 proceeds to step/operation 1305. At step/operation 1305, a computing entity (such as the vector computing entity 105 described above in connection with FIG. 1 and FIG. 2) may include means (such as the processing element 205 of the vector computing entity 105 described above in connection with FIG. 2) to generate record text vector(s) based at least in part on the record text descriptor(s) and a natural language processing model.

In some embodiments, the processing element may generate one or more record text vectors based at least in part on the one or more record text descriptors and a second natural language processing model, similar to those described above in connection with at least step/operation 707 of FIG. 7.

For example, the second natural language processing model may be pre-trained using BERT and text data including, but not limited to, biomedical domain text data and/or general domain text data. As such, the second natural language processing model may interpret the descriptions associated with the record text descriptors to generate the one or more record text vectors.

Continuing from the EMR example above, the processing element may provide the one or more record text descriptors associated with a record data element to a natural language processing model, such as, but not limited to, a transformer. For example, the processing element may provide a record text descriptor of the description of symptoms as an input to the transformer, and the transformer may generate a corresponding record text vector.

Referring back to FIG. 13, subsequent to step/operation 1305, the example method 1300 proceeds to step/operation 1307. At step/operation 1307, a computing entity (such as the vector computing entity 105 described above in connection with FIG. 1 and FIG. 2) may include means (such as the processing element 205 of the vector computing entity 105 described above in connection with FIG. 2) to generate encounter vector(s) based at least in part on the record text vector(s) and a natural language processing model.

In some embodiments, the processing element may generate the one or more encounter vectors based at least in part on the one or more record text vectors generated at step/operation 1305 and a third natural language processing model. As described above, the one or more record text vectors generated at step/operation 1305 are based at least in part on one or more record text descriptors, which are associated with record data elements. As the record data elements are associated with one or more encounter identifiers, the one or more record text vectors are associated with the one or more encounter identifiers.

In some embodiments, the processing element may identify one or more record text vectors associated with an encounter identifier, and may provide these record text vectors to a natural language processing model, such as, but not limited to, a transformer. The natural language processing model may generate an encounter vector based at least in part on these record text vectors, and the encounter vector is associated with the encounter identifier.

Continuing from the EMR example above, the processing element may identify one or more record text vectors associated with an encounter identifier (for example, identify one or more record text vectors that are generated based at least in part on data/information associated with a Jan. 1, 2021 visit to the doctor's office). The processing element may provide these record text vectors to another natural language processing model (such as, but not limited to, a transformer). In some embodiments, the transformer may generate an encounter vector based at least in part on these record text vectors, and the encounter vector is associated with a corresponding encounter identifier (for example, Jan. 1, 2021).

Referring back to FIG. 13, subsequent to step/operation 1307, the example method 1300 proceeds to step/operation 1309 and ends.

As such, in accordance with various examples of the present disclosure, when generating an encounter vector (with respect to one or more data elements associated with a visit), the processing element may associate the one or more data elements with respective texts (each a text); encode each of the respective texts with a second transformer to yield respective text vectors (each a text vector); and generate the encounter vector using a third transformer to encode one or more text vectors.

As described herein, the one or more record data elements may comprise or be associated with one or more record category identifiers. Accordingly, one or more encounter vectors may be generated based at least in part on the one or more record category identifiers associated with the one or more record data elements (without using record text descriptors).

Figure 14:
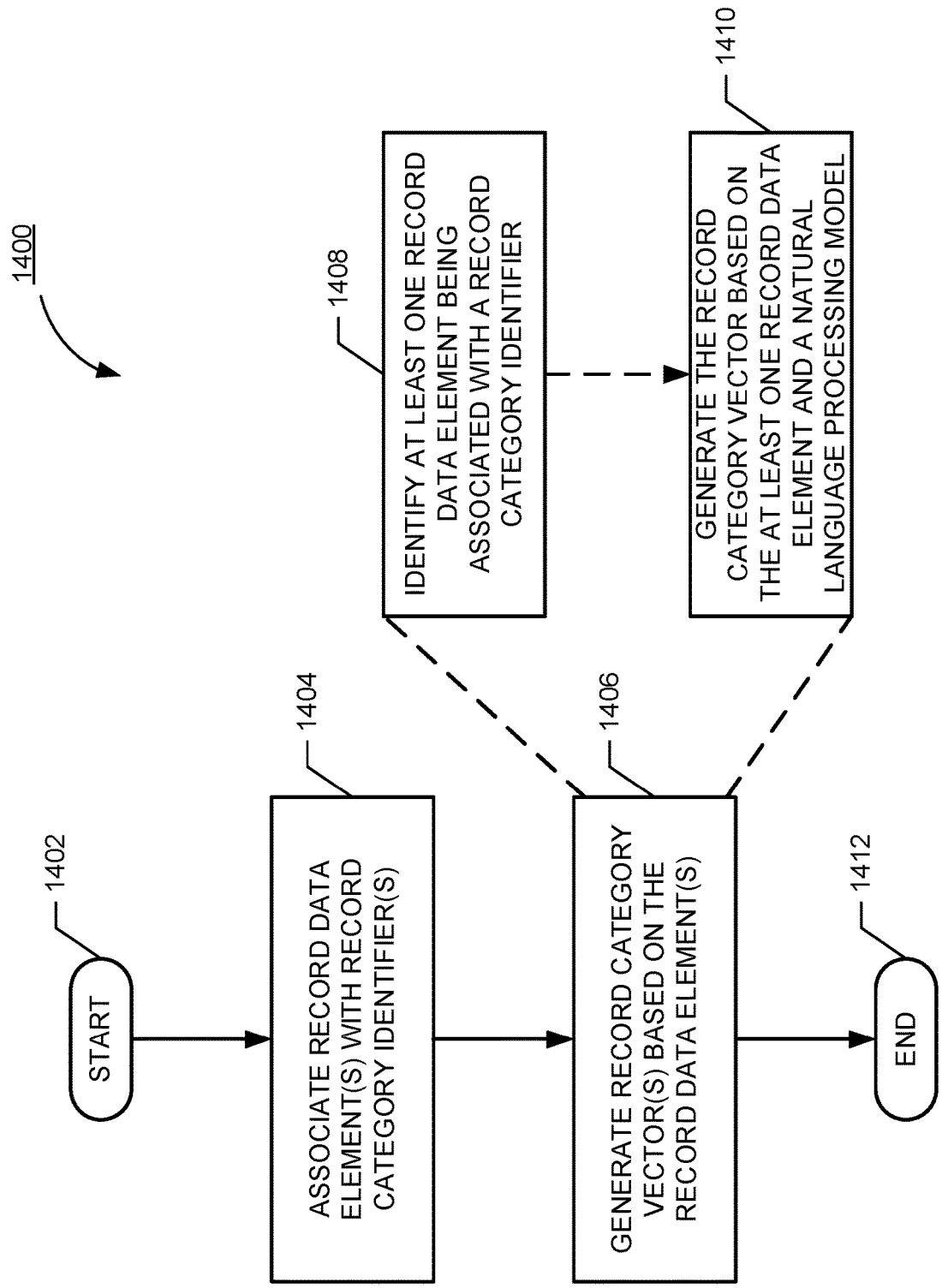

Referring now to FIG. 14, an example method 1400 in accordance with embodiments of the present disclosure is illustrated. In particular, the example method 1400 illustrates an example of generating one or more record category vectors in accordance with various embodiments of the present disclosure.

As shown in FIG. 14, The example method 1400 starts at step/operation 1402. Subsequent to step/operation 1402, the example method 1400 proceeds to step/operation 1404. At step/operation 1404, a computing entity (such as the vector computing entity 105 described above in connection with FIG. 1 and FIG. 2) may include means (such as the processing element 205 of the vector computing entity 105 described above in connection with FIG. 2) to associate record data element(s) with record category identifier(s).

In some embodiments, the processing element associates the one or more record data elements with one or more record category identifiers similar to those described above in connection with at least step/operation 703 of FIG. 7.

For example, the processing element may retrieve a plurality of record data elements in the form of EMRs. One or more of the EMRs may comprise an ICD code related to a diagnosis of disease associated with a patient. In such an example, the processing element may establish a data association between the corresponding EMR(s) and the ICD code.

Referring back to FIG. 14, subsequent to step/operation 1404, the example method 1400 proceeds to step/operation 1406. At step/operation 1406, a computing entity (such as the vector computing entity 105 described above in connection with FIG. 1 and FIG. 2) may include means (such as the processing element 205 of the vector computing entity 105 described above in connection with FIG. 2) to generate record category vector(s) based at least in part on the record data element(s).

In some embodiments, to generate one or more record category vectors associated with the one or more record category identifiers based at least in part on the one or more record data elements, step/operation 1406 of FIG. 14 may be carried out by the processing element in a variety of different ways. For example, in some embodiments, step/operation 1406 may comprise step/operation 1408 and step/operation 1410 as shown in FIG. 14, which illustrate generating a corresponding record category vector (of the one or more record category vectors) that is associated with a corresponding record category identifier (of the one or more record category identifiers) in accordance with various embodiments of the present disclosure.

At step/operation 1408, a computing entity (such as the vector computing entity 105 described above in connection with FIG. 1 and FIG. 2) may include means (such as the processing element 205 of the vector computing entity 105 described above in connection with FIG. 2) to identify at least one record data element being associated with a record category identifier.

In some embodiments, the processing element may identify at least one record data element (from one or more record data elements) being associated with the corresponding record category identifier of the one or more record category identifiers based at least in part on the data association established at step/operation 1404.

Continuing from the EMR example above, based at least in part on the data association between an EMR and the ICD code, the processing element may identify/select the EMR from the plurality of EMRs.

Referring back to FIG. 14, subsequent to step/operation 1408, the example method 1400 proceeds to step/operation 1410. At step/operation 1410, a computing entity (such as the vector computing entity 105 described above in connection with FIG. 1 and FIG. 2) may include means (such as the processing element 205 of the vector computing entity 105 described above in connection with FIG. 2) to generate the record category vector based at least in part on the at least one record data element and a natural language processing model.

In some embodiments, the processing element may generate a corresponding record category vector (associated with the corresponding record category identifier) based at least in part on the at least one record data element identified at step/operation 1408 and a second natural language processing model. For example, the processing element may provide the at least one record data element identified at step/operation 1408 to the second natural language processing model, and the second natural language processing model may generate a record category vector based at least in part on the at least one record data element.

For example, the second natural language processing model may be pre-trained using BERT and text data including, but not limited to, biomedical domain text data and/or general domain text data. As such, the second natural language processing model may interpret the descriptions associated with the record data elements to generate the one or more record category vectors.

Continuing from the EMR example above, the processing element may generate a record category vector for the ICD code based at least in part on the EMR associated with the ICD code. Similarly, the processing element may generate a record category vector for each of the record category identifier(s) associated with a record data element based at least in part on identifying the corresponding record data element(s) and providing such record data element(s) to a natural language processing model.

In some embodiments, subsequent to generating one or more record category vectors, the processing element may generate an encounter vector based at least in part on the one or more record category vectors, similar to those described above in connection with at least FIG. 9.

For example, the processing element may identify at least one record category identifier, from the one or more record category identifiers, being associated with an encounter identifier of the one or more encounter identifiers based at least in part on the one or more record data elements. The processing element may identify at least one record category vector, from the one or more record category vectors, being associated with the at least one record category identifier. The processing element may generate an encounter vector associated with the encounter identifier based at least in part on the at least one record category vector.

Additionally, or alternatively, similar to those described herein in connection with at least FIG. 11, the processing element may determine whether more than one record category vector is associated with the encounter identifier. In response to determining that only one record category vector is associated with the at least one record category identifier, the processing element may assign the only one record category vector as the encounter vector. In response to determining that a plurality of record category vectors are associated with the at least one record category identifier, the processing element may generate the encounter vector based at least in part on combining the plurality of record category vectors.

Referring back to FIG. 14, subsequent to step/operation 1406 or step/operation 1410, the example method 1400 proceeds to step/operation 1412 and ends.

As such, in accordance with various embodiments of the present disclosure, when generating an encounter vector (with respect to one or more data elements associated with a visit), the processing element may associate the one or more data elements with respective record categories (each a record category), and, for each record category associated with the visit, generate a record category vector using a second transformer to encode one or more data elements associated with the each record category. In some embodiments, if only one record category vector is associated with the visit, the processing element may generate the encounter vector using the only one record category vector. In some embodiments, if multiple record category vectors are associated with the visit, the processing element may generate the encounter vector using a combination of the multiple record category vectors.

e. Exemplary Generation of Client Vectors

Figure 15:
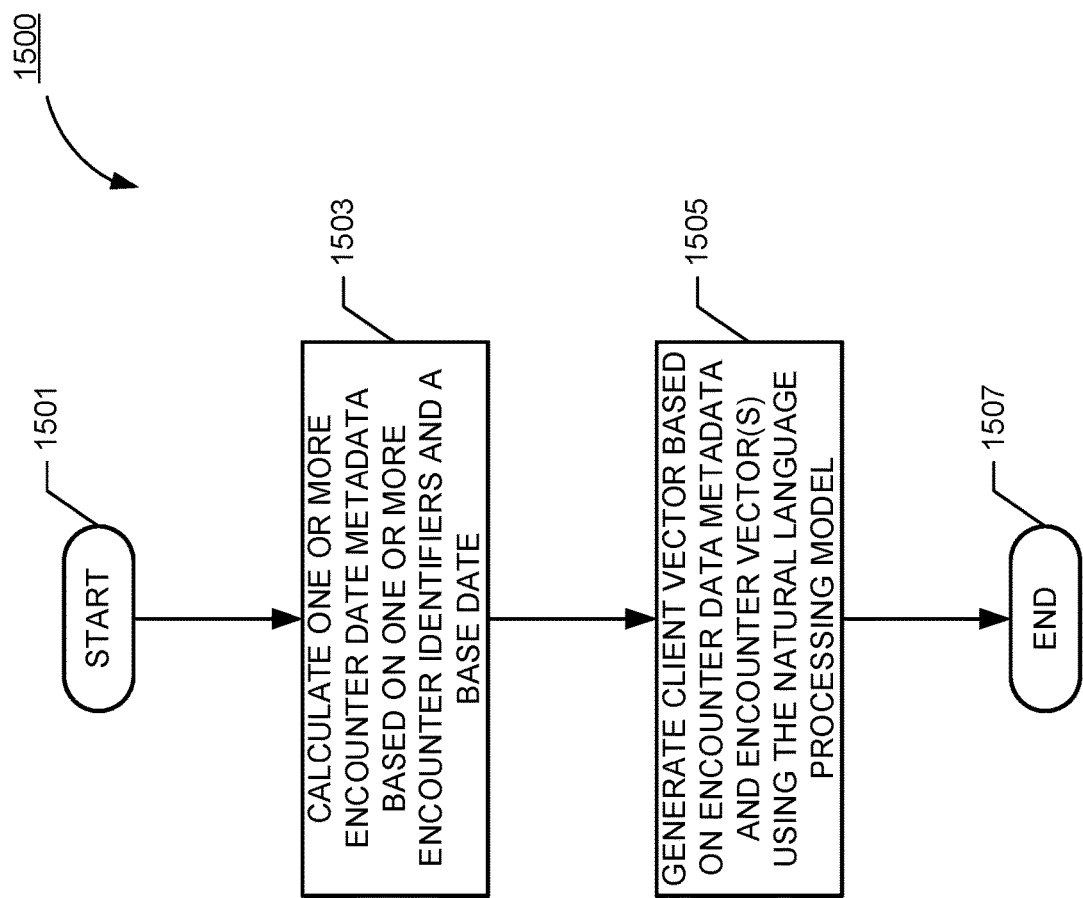
Figure 16:
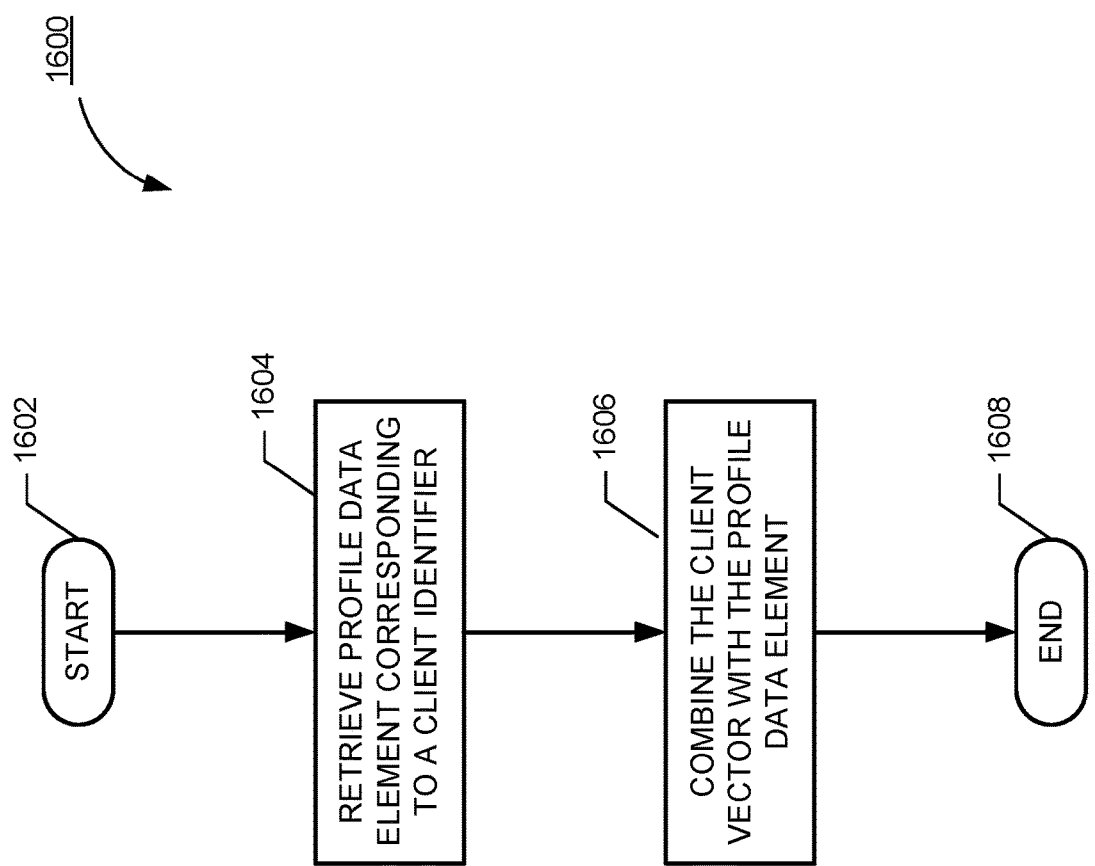
Figure 17:
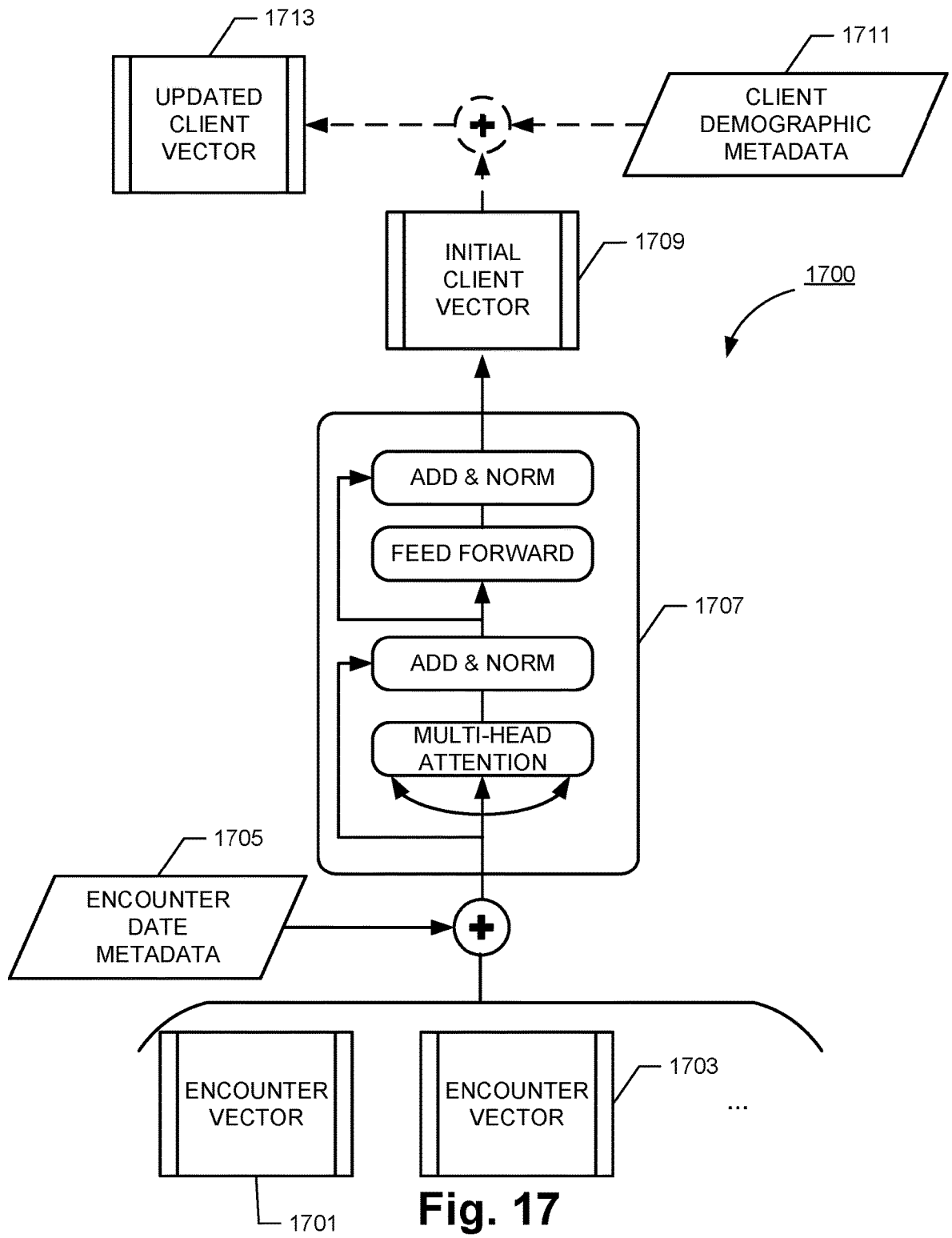

In various embodiments of the present disclosure, a computing entity (such as the vector computing entity 105 described above in connection with FIG. 1 and FIG. 2) may implement various processing techniques (including, but not limited to, one or more encoding and/or embedding techniques) to generate one or more client vectors (for example, but not limited to, in connection with step/operation 408 of FIG. 4 above). Referring now to FIG. 15-FIG. 17, various examples associated with generating one or more client vectors are illustrated.

Referring now to FIG. 15, an example method 1500 illustrates an example of generating client vectors based at least in part on the encounter identifiers and the one or more encounter vectors using the first natural language processing in accordance with embodiments of the present disclosure.

As shown in FIG. 15, the example method 1500 starts at step/operation 1501. Subsequent to step/operation 1501, the example method 1500 proceeds to step/operation 1503. At step/operation 1503, a computing entity (such as the vector computing entity 105 described above in connection with FIG. 1 and FIG. 2) may include means (such as the processing element 205 of the vector computing entity 105 described above in connection with FIG. 2) to calculate one or more encounter date metadata based at least in part on the one or more encounter identifiers and a base date.

As described above, each of the encounter identifiers refers to a temporal identifier that identifies data and/or information associated with an encounter. For example, an example encounter identifier may be in the form of a timestamp or a time code associated with an EMR.

In some embodiments, the encounter date metadata captures the temporal information associated with the record data elements. For example, the processing element may calculate an encounter date metadata associated with an encounter based at least in part on calculating a relative time period between a base date (for example, the date of the first encounter) and the timestamp associated with encounter identifier. Additionally, or alternatively, the processing element may calculate an encounter date metadata based at least in part on the number of days since the patient's last visit. Additionally, or alternatively, the processing element may calculate an encounter date metadata based at least in part on other methods.

As an example, the processing element may retrieve record data elements related to a client/patient Adam, and the record data elements may comprise four EMRs. The first EMR is associated with an encounter identifier of Jan. 1, 2021. The second EMR is associated with an encounter identifier of Feb. 1, 2021. The third EMR and the fourth EMR are associated with an encounter identifier of Apr. 1, 2021.

In this example, the processing element may set the encounter identifier of Jan. 1, 2021 as the base date, as it is the earliest encounter in these EMRs. The processing element may calculate an encounter date metadata for the encounter identifier of Jan. 1, 2021, which equals the base date. The processing element may calculate an encounter date metadata for the encounter identifier of Feb. 1, 2021 based at least in part on calculating a time gap between Feb. 1, 2021 and Jan. 1, 2021. The processing element may calculate an encounter date metadata for the encounter identifier of Apr. 1, 2021 based at least in part on calculating a time gap between Apr. 1, 2021 and Jan. 1, 2021.

Additionally, or alternatively, the processing element may set the previous encounter date as the base date. In this example, the processing element may calculate an encounter date metadata for the encounter identifier of Apr. 1, 2021 based at least in part on calculating a time gap between Apr. 1, 2021 and Feb. 1, 2021 (instead of between Apr. 1, 2021 and Jan. 1, 2021).

Referring back to FIG. 15, subsequent to step/operation 1503, the example method 1500 proceeds to step/operation 1505. At step/operation 1505, a computing entity (such as the vector computing entity 105 described above in connection with FIG. 1 and FIG. 2) may include means (such as the processing element 205 of the vector computing entity 105 described above in connection with FIG. 2) to generate the client vector based at least in part on the encounter data metadata and the one or more encounter vectors using the first natural language processing model.

As described above, the processing element may generate one or more encounter vectors, each associated with a corresponding encounter identifier. In various embodiments of the present disclosure, an example client vector may be generated based at least in part on the encounter identifiers and the one or more encounter vectors using the first natural language processing model.

In the example method 1500 shown in FIG. 15, the processing element may provide the encounter data metadata calculated at step/operation 1503 and the one or more encounter vectors to a natural language processing model, and the natural language processing model may generate a client vector. As described above, the natural language processing model may be referred to as the first natural language processing model, and first natural language processing model may include, but not limited to, a transformer (for example, a pre-trained transformer using BERT and biomedical domain text data and/or general domain text data) described above.

In some embodiments, the first natural language processing model is configured to perform one or more of pre-computed embeddings, learned embeddings, or relative embedding to generate a corresponding client vector. For example, when performing pre-computed embedding, the first natural language processing model may retrieve word embeddings that have been pre-computed and stored in a database. Additionally, or alternatively, when performing learned embeddings, the first natural language processing model may perform machine learning techniques to generate one or more embeddings. Additionally, or alternatively, when performing relative embedding, the first natural language processing model may calculate relative distances between each relevant word/phrase to embed/generate one or more client vectors. Additionally, or alternatively, the first natural language processing model may generate one or more client vectors through other embedding mechanisms and/or techniques.

Continuing from the EMR example above, the processing element may generate an encounter vector associated with the encounter identifier Jan. 1, 2021, an encounter vector associated with the encounter identifier Feb. 1, 2021, and an encounter vector associated with the encounter identifier Apr. 1, 2021 in accordance with various examples described herein. The processing element may provide these encounter vectors, along with the corresponding encounter date metadata calculated at step/operation 1503, to a natural language processing model (such as, but not limited to, a transformer that has been trained (for example, BERT) using domain data (such as, but not limited to, biomedical and general domain text data) as described herein.

Referring back to FIG. 15, subsequent to step/operation 1505, the example method 1500 proceeds to step/operation 1507 and ends.

Referring now to FIG. 16, an example method 1600 illustrates an example of generating an updated client vector in accordance with embodiments of the present disclosure.

As shown in FIG. 16, the example method 1600 starts at step/operation 1602. Subsequent to step/operation 1602, the example method 1600 proceeds to step/operation 1604. At step/operation 1604, a computing entity (such as the vector computing entity 105 described above in connection with FIG. 1 and FIG. 2) may include means (such as the processing element 205 of the vector computing entity 105 described above in connection with FIG. 2) to retrieve a profile data element corresponding to a client identifier.

In some embodiments, the processing element may retrieve a profile data element corresponding to the client identifier from a network database. As described above, the profile data element may be stored in a central storage device. In some embodiments, the central storage device is external to the vector generating platform/system described herein. In some embodiments, the central storage device is internal to the vector generating platform/system described herein.

As described above, the profile data element may comprise metadata, such as, but not limited to, client demographic metadata. In some embodiments, the processing element may extract the client demographic metadata from the profile data element. Examples of client demographic metadata may comprise data and/or information including, but not limited to, gender, ethnicity, race, age, marital status, income, education, and/or the like.

Referring back to FIG. 16, subsequent to step/operation 1604, the example method 1600 proceeds to step/operation 1606. At step/operation 1606, a computing entity (such as the vector computing entity 105 described above in connection with FIG. 1 and FIG. 2) may include means (such as the processing element 205 of the vector computing entity 105 described above in connection with FIG. 2) to combine the client vector with the profile data element.

In some embodiments, the processing element may generate an initial client vector in accordance with various examples described herein. At step/operation 1606, the processing element may generate an updated client vector based at least in part on combining the initial client vector with data and/or information associated with the profile data element (such as, but not limited to, client demographic metadata). For example, the processing element may generate an updated client vector based at least in part on combining the initial client vector with the client demographic metadata.

In some embodiments, the processing element may combine the client vector with the profile data element based at least in part on one or more of summation, multiplication, or one or more artificial neural networks. For example, step/operation 1606 may be carried out by the processing element in a variety of different ways, including, but not limited to, one or more of performing summation on the initial client vector and the profile data element (such as, but not limited to, client demographic metadata) to generate the updated client vector, performing multiplication on the initial client vector and the profile data element (such as, but not limited to, client demographic metadata) to generate the updated client vector, and/or providing the initial client vector and the profile data element (such as, but not limited to, client demographic metadata) to artificial neural networks to generate the updated client vector, similar to those described above.

In some embodiments, the processing element may provide the initial client vector to a machine learning model, and the machine learning model may generate a prediction data element as described herein. In some embodiments, the processing element may provide the updated client vector (including combined profile data element such as client demographic metadata) to a machine learning model, and the machine learning model may generate a prediction data element as described herein.

Referring back to FIG. 16, subsequent to step/operation 1606, the example method 1600 proceeds to step/operation 1608 and ends.

Referring now to FIG. 17, an example diagram 1700 illustrates an example method of generating a client vector based at least in part on one or more encounter vectors, encounter date metadata, (and client demographic metadata).

In the example shown in FIG. 17, the processing element may generate one or more encounter vectors (such as, but not limited to, the encounter vector 1701, the encounter vector 1703) in accordance with various examples described herein. For example, the one or more encounter vectors (such as, but not limited to, the encounter vector 1701, the encounter vector 1703) are associated with a client identifier, and each of the one or more encounter vectors is associated with a corresponding encounter identifier.

In some embodiments, the processing element may calculate encounter data metadata 1705 associated with the encounter identifier(s) in accordance with examples described herein. In some embodiments, the encounter data metadata 1705 and the one or more encounter vectors (such as, but not limited to, the encounter vector 1701, the encounter vector 1703) may be combined and provided as input to the natural language processing model 1707 to generate the initial client vector 1709. In some embodiments, the initial client vector 1709 is associated with the client identifier.

In the example shown in FIG. 17, the natural language processing model 1707 may comprise one or more layers. For example, the natural language processing model 1707 may comprise a multi-head attention layer, a feed forward layer, and one or more add & norm layers. Similar to the example natural language processing model 1004 described above in connection with FIG. 10, the multi-head attention layer may utilize a multi-head attention mechanism to perform transformation on the input data to generate one or more attention vectors, the feed forward layer may transform the attention vectors into another form that is suitable for the next layer/transformer, and add & norm layers may follow each of the multi-head attention layer and the feed forward layer to normalize the output from the prior layer.

While the description above provides an example of a natural language processing model, it is noted that the scope of the present disclosure is not limited to the description above. In some examples, an example natural language processing model may comprise one or more additional and/or alternative layers, and/or may be in one or more additional and/or alternative forms.

In some embodiments, the natural language processing model 1707 may generate an initial client vector 1709 associated with the client identifier. In some embodiments, the processing element may extract client demographic metadata 1711 from a profile data element associated with the client identifier, similar to those described above. In some embodiments, the initial client vector 1709 and the client demographic metadata 1711 may be combined to generate an updated client vector 1713, similar to those described above. In some embodiments, the updated client vector 1713 is provided to a machine learning model, which generates a prediction data element, similar to those described above.

As such, in accordance with various embodiments of the present disclosure, a processing element may generate a client vector representing a particular patient. In some embodiments, the client vector is generated by using a transformer to encode all the encounter vectors for a given patient into a single vector. Any or all of the transformers described in this method may be trained using BERT, although BERT training may not be essential for yielding predictions relative to disease or health state, details of which are described herein.

f. Exemplary Training of Machine Learning Model

Figure 18:
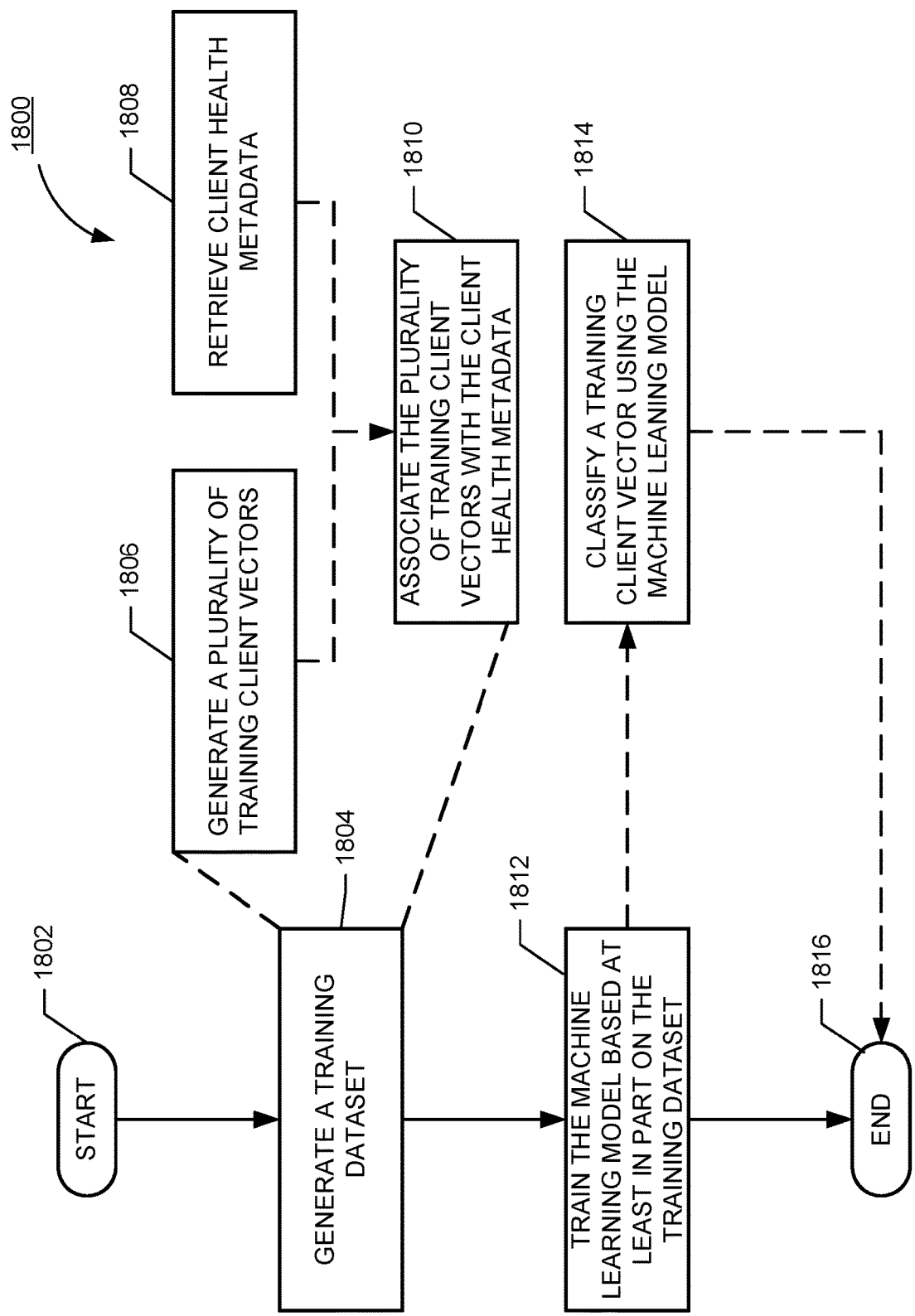
Figure 19:
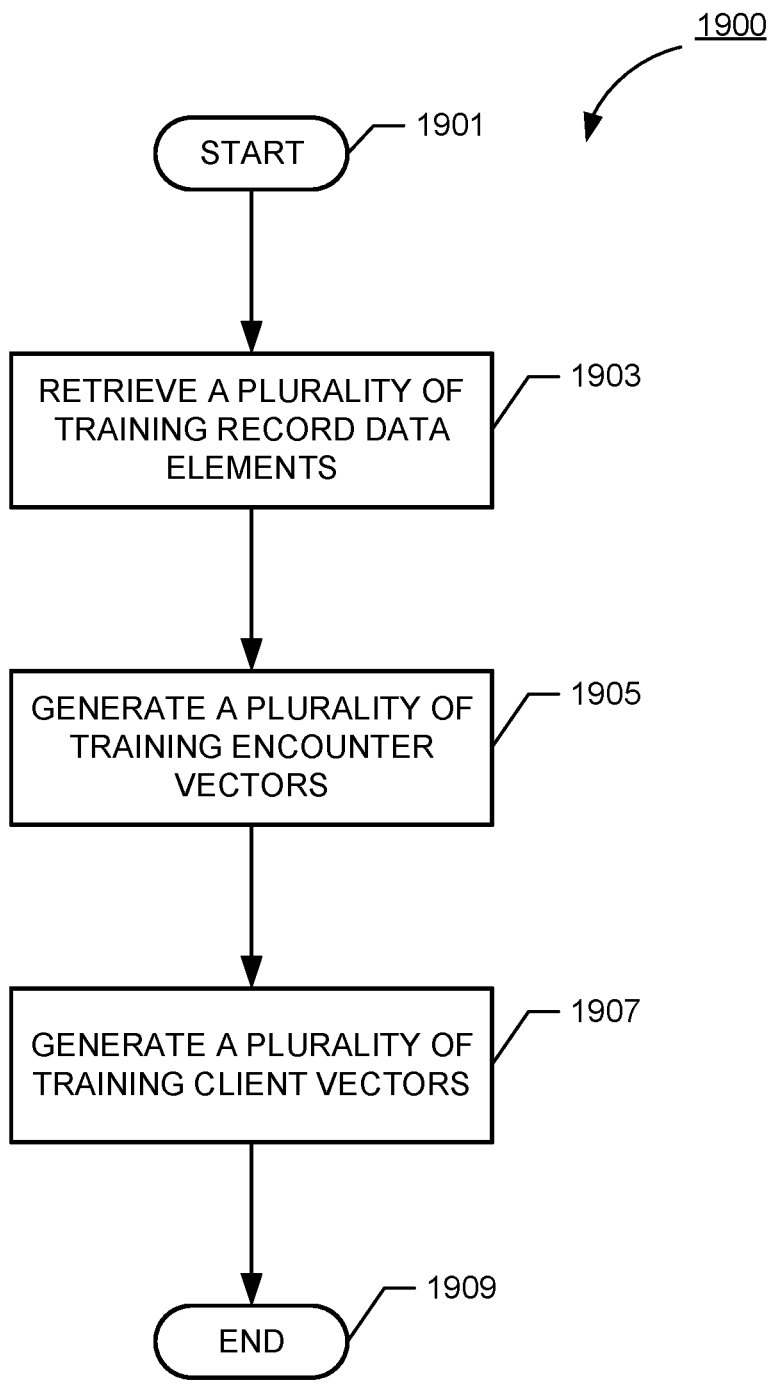

As described above, example embodiments of the present disclosure may generate a prediction data element based at least in part a client vector (and data and/or information associated with a profile data element) using a machine learning model. In various embodiments of the present disclosure, a computing entity (such as the vector computing entity 105 described above in connection with FIG. 1 and FIG. 2) may implement various processing techniques (including, but not limited to, one or more encoding and/or embedding techniques) to train the machine learning model to generate a prediction data element. Referring now to FIG. 18-FIG. 19, various examples associated with training a machine learning model are illustrated.

Referring now to FIG. 18, an example method 1800 illustrates an example method of generating training dataset and training a machine learning model based at least in part on the training dataset in accordance with embodiments of the present disclosure.

As shown in FIG. 18, the example method 1800 starts at step/operation 1802. Subsequent to step/operation 1802, the example method 1800 proceeds to step/operation 1804. At step/operation 1804, a computing entity (such as the vector computing entity 105 described above in connection with FIG. 1 and FIG. 2) may include means (such as the processing element 205 of the vector computing entity 105 described above in connection with FIG. 2) to generate a training dataset.

In some embodiments, the processing element is configured to generate a training dataset that comprises a plurality of training client vectors labeled with corresponding client health metadata. In accordance with various embodiments of the present disclosure, step/operation 1804 of FIG. 18 may be carried out by the processing element in a variety of different ways. For example, in some embodiments, step/operation 1804 may comprise step/operation 1806, step/operation 1808, and step/operation 1810.

At step/operation 1806, a computing entity (such as the vector computing entity 105 described above in connection with FIG. 1 and FIG. 2) may include means (such as the processing element 205 of the vector computing entity 105 described above in connection with FIG. 2) to generate a plurality of training client vectors.

In some embodiments, the processing element may generate each of the plurality of training client vectors similar to those described above in connection with generating client vectors. For example, the processing element may retrieve a plurality of training record data elements, generate a plurality of training encounter vectors, and generate the plurality of training client vectors based at least in part on the plurality of training encounter vectors. In some embodiments, each of the training client vectors is associated with a corresponding client identifier.

As an example, the processing element may generate training client vectors based at least in part on EMRs associated with clients/patients Adam, Brandon, and Cindy. In this example, the processing element may generate a training client vector based at least in part on EMRs associated with Adam, a training client vector based at least in part on EMRs associated with Brandon, and a training client vector based at least in part on the EMRs associated with Cindy.

Additional details associated with generating the plurality of training client vectors are described in connection with at least FIG. 19.

Referring back to FIG. 18, at step/operation 1808, a computing entity (such as the vector computing entity 105 described above in connection with FIG. 1 and FIG. 2) may include means (such as the processing element 205 of the vector computing entity 105 described above in connection with FIG. 2) to retrieve client health metadata.

As described above, the client health metadata may represent and/or comprise data related to health information of a client/patient. For example, client health metadata may represent/comprise information such as, but not limited to, disease progression associated with a client, health state associated with the client, symptoms associated with the patient and/or the like. Additionally, or alternatively, the client health metadata may comprise one or more of presence/absence indicator, a presence timespan indicator, a severity indicator, or a severity timespan indicator as described above.

In some embodiments, the profile data element may comprise the client health metadata associated with a corresponding client identifier. In some embodiments, the processing element may retrieve a profile data element for each client identifier associated with the training client vectors based at least in part on the corresponding client identifier, and may extract the corresponding client health metadata from the corresponding profile data element. In some embodiments, the processing element may retrieve client health metadata associated with the corresponding client identifier for each of the plurality of training client vectors generated at step/operation 1808.

Continuing from the EMR example above, the processing element may retrieve client health metadata associated with Adam, client health metadata associated with Brandon, and client health metadata associated with Cindy.

Referring back to FIG. 18, subsequent to step/operation 1806 and/or step/operation 1808, the example method 1800 proceeds to step/operation 1810. At step/operation 1810, a computing entity (such as the vector computing entity 105 described above in connection with FIG. 1 and FIG. 2) may include means (such as the processing element 205 of the vector computing entity 105 described above in connection with FIG. 2) to associate the plurality of training client vectors with the client health metadata.

In some embodiments, the processing element may establish one or more data associations between each of the plurality of training client vectors and the corresponding client health metadata. For example, the processing element may establish a data association between a training client vector associated with a client identifier and a corresponding client health metadata associated with the same client identifier.

As an example, each of the training client vectors is labeled with respect to the health condition of interest based at least in part on the client health metadata. The label may be discrete (such as, but not limited to, presence/absence of a disease) or continuous (for example, but not limited to, progression or severity of a disease). In some embodiments, the training dataset comprises one or more training client vectors associated with one or more corresponding client health metadata.

Continuing from the EMR example above, the processing element may associate client health metadata of Adam with the training client vector of Adam. The processing element may associate client health metadata of Brandon with the training client vector of Brandon. The processing element may associate client health metadata of Cindy with the training client vector of Cindy. In this example, the training dataset comprises training client vectors (that are generated based at least in part on EMRs associated with Adam, Brandon, and Cindy) and their associated client health metadata (corresponding to Adam's, Brandon's, and Cindy's, respectively).

Referring back to FIG. 18, subsequent to step/operation 1804, the example method 1600 proceeds to step/operation 1812. At step/operation 1812, a computing entity (such as the vector computing entity 105 described above in connection with FIG. 1 and FIG. 2) may include means (such as the processing element 205 of the vector computing entity 105 described above in connection with FIG. 2) to train the machine learning model based at least in part on the training dataset generated at step/operation 1804.

In some embodiments, the processing element may train the machine learning model at step/operation 1812 so that the machine learning model may learn from the training dataset. In some embodiments, step/operation 1812 of FIG. 18 may be carried out by the processing element in a variety of different ways. For example, in some embodiments, step/operation 1812 may comprise step/operation 1814. At step/operation 1814, a computing entity (such as the vector computing entity 105 described above in connection with FIG. 1 and FIG. 2) may include means (such as the processing element 205 of the vector computing entity 105 described above in connection with FIG. 2) to classify a training client vector (from the training dataset generated at step/operation 1804) using the machine learning model.

In some embodiments, the classification can be based at least in part on patient data that is included in the training client vector. For example, the processing element may classify a training client vector of the plurality of training client vectors with respect to a corresponding client health metadata using the machine learning model. For example, the processing element may provide the plurality of training client vectors as inputs to the machine learning model, and the machine learning model may generate one or more prediction data elements based at least in part on the plurality of training client vectors. The processing element may cause the machine learning model to compare the generated prediction data elements with the corresponding client health metadata, and may adjust one or more parameters in the machine learning model if the prediction data element deviates significantly from the corresponding client health metadata. This adjustment process may be repeated until prediction data elements generated by the machine learning model closely matches the corresponding client health metadata.

Continuing from the EMR example above, the client health metadata associated with Adam may indicate that Adam has rheumatoid arthritis. The processing element may provide the training client vector associated with Adam to the machine learning model, and the machine learning model may generate a prediction data element comprising a presence/absence determination on rheumatoid arthritis. In some embodiments, the machine learning model or the processing element may determine whether the presence/absence determination of the prediction data element indicates the presence of rheumatoid arthritis. If not, the machine learning model or the processing element may adjust one or more parameters associated with the machine learning model until the presence/absence determination of the prediction data element indicates rheumatoid arthritis.

As such, in various embodiments of the present disclosure, the machine learning model may be configured and/or adjusted to generate accurate prediction data elements through training using one or more training datasets.

Referring back to FIG. 18, subsequent to step/operation 1812 or step/operation 1814, the example method 1800 proceeds to step/operation 1816 and ends.

As such, in accordance with various embodiments of the present disclosure, a client vector is classified by a learning model or algorithm to yield a presence/absence determination or a probability, progression, or severity measure with respect to the patient exhibiting a health condition within a given time period. In some embodiments, the machine learning model may be a supervised learning model that has been trained to classify a first set of training client vectors with respect to the corresponding client health metadata. In some embodiments, a training encounter vector is generated for each of one or more visits, and a training client vector is generated using the first natural language processing model (for example, a transformer) to encode one or more training encounter vectors. In some embodiments, the training client vectors are labeled with respect to the corresponding client health metadata.

Referring now to FIG. 19, an example method 1900 illustrates an example of generating training client vectors in accordance with embodiments of the present disclosure.

As shown in FIG. 19, the example method 1900 starts at step/operation 1901. Subsequent to step/operation 1901, the example method 1900 proceeds to step/operation 1903. At step/operation 1903, a computing entity (such as the vector computing entity 105 described above in connection with FIG. 1 and FIG. 2) may include means (such as the processing element 205 of the vector computing entity 105 described above in connection with FIG. 2) to retrieve a plurality of training record data elements.

In some embodiments, the processing element may retrieve the plurality of training record data elements similar to those described above in connection with at least step/ operation 404 of FIG. 4. For example, the plurality of training record data elements are associated with a plurality of training client identifiers and a plurality of training encounter identifiers. In some embodiments, each of the plurality of training record data elements is associated with a training encounter identifier of the plurality of training encounter identifiers. In some embodiments, each of the plurality of training encounter identifiers is associated with a training client identifier of the plurality of training client identifiers.

As an example, the processing element may retrieve training record data elements in the form of EMRs representing encounters associated with clients/patients Adam, Brandon, and Cindy. In this example, the training record data elements are associated with the training client identifiers of Adam's, Brandon's, and Cindy's, as well as the training encounter identifiers associated with these encounters. For example, an EMR (e.g. a training record data element) may be associated with Jan. 1, 2021 (e.g. a training encounter identifier), which is associated with a visit by Adam (e.g. a training client identifier) to a doctor's office.

Referring back to FIG. 19, subsequent to step/operation 1903, the example method 1900 proceeds to step/operation 1905. At step/operation 1905, a computing entity (such as the vector computing entity 105 described above in connection with FIG. 1 and FIG. 2) may include means (such as the processing element 205 of the vector computing entity 105 described above in connection with FIG. 2) to generate a plurality of training encounter vectors.

In some embodiments, the processing element may generate the plurality of training encounter vectors similar to those described above in connection with generating encounter vectors (such as, but not limited to, those described above in connection with at least FIG. 4 and FIG. 7 to FIG. 14). For example, the processing element may generate the training encounter vectors based at least in part on the plurality of training record data elements. In some embodiments, the training encounter vectors are associated with the plurality of training client identifiers and the plurality of training encounter identifiers. In some embodiments, each of the plurality of training encounter vectors is associated with one of the plurality of training encounter identifiers and one of the plurality of training client identifiers.

Continuing from the EMR example above, the processing element may generate one or more training encounter vectors based at least in part on the training record data elements associated with Adam. For example, the processing element may associate one or more training record data elements with record category identifier(s) and record text descriptor(s), may generate one or more record text vectors based at least in part on the record text descriptor(s), may generate one or more record category vectors based at least in part on the one or more record text vectors and a natural language processing model, similar to those described above.

Continuing from the EMR example above, the processing element may generate one or more training encounter vectors associated with Adam based at least in part on the one or more record category vectors, similar to those described above. In this example, each of the plurality of training encounter vectors is associated with Adam (e.g. a training client identifier) and a corresponding encounter identifier (e.g. Jan. 1, 2021).

Referring back to FIG. 19, subsequent to step/operation 1905, the example method 1900 proceeds to step/operation 1907. At step/operation 1907, a computing entity (such as the vector computing entity 105 described above in connection with FIG. 1 and FIG. 2) may include means (such as the processing element 205 of the vector computing entity 105 described above in connection with FIG. 2) to generate the plurality of training client vectors.

In some embodiments, the processing element may generate the plurality of training client vectors based at least in part on the plurality of training encounter vectors generated at step/operation 1905 and the first natural language processing model, similar to those described above in connection with generating client vectors (such as, but not limited to, those described above in connection with at least FIG. 4 and FIG. 15 to FIG. 18).

Continuing from the EMR example above, the processing element may generate one or more training client vectors based at least in part on the training encounter vectors. For example, the processing element may provide training encounter vectors associated with Adam as input to a natural language processing model, and the natural language processing model may generate a training client vector associated with Adam. In some embodiments, the processing element may embed temporal information in the training client vector, similar to those described above.

Referring back to FIG. 19, subsequent to step/operation 1907, the example method 1900 proceeds to step/operation 1909 and ends.

As such, in accordance with various embodiments of the present disclosure, a supervised learning model is trained on multiple client vectors, each generated in accordance with examples described herein and each labeled with respect to the health condition of interest. The label may be discrete (e.g., presence/absence) or continuous (e.g., progression or severity). Various embodiments of the present disclosure provide a method of classifying a patient record with respect to a health state or as a method of training a supervised learning algorithm to classify patient records with respect to a health state.

V. Conclusion

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus comprising at least one processor and at least one non-transitory memory comprising a computer program code, the at least one non-transitory memory and the computer program code configured to, with the at least one processor, cause the apparatus to:
retrieve one or more record data elements associated with a client identifier, wherein each of the one or more record data elements is associated with an encounter identifier of one or more encounter identifiers, wherein the one or more encounter identifiers are associated with the client identifier;
generate one or more encounter vectors based at least in part on the one or more record data elements, wherein the one or more encounter vectors are associated with the one or more encounter identifiers;

generate a client vector based at least in part on the one or more encounter vectors, wherein the client vector is associated with the client identifier, wherein a first natural language processing model is associated with at least one of the one or more encounter vectors or the client vector;

generate a prediction data element based at least in part on the client vector and a machine learning model, wherein the prediction data element is associated with the client identifier; and perform at least one data operation based at least in part on the prediction data element.

2. The apparatus of claim 1, wherein, when generating the one or more encounter vectors, the at least one non-transitory memory and the computer program code are configured to, with the at least one processor, cause the apparatus to:

associate the one or more record data elements with one or more record category identifiers;

associate the one or more record data elements with one or more record text descriptors; and generate one or more record text vectors based at least in part on the one or more record text descriptors and a second natural language processing model.

3. The apparatus of claim 2, wherein the at least one non-transitory memory and the computer program code are configured to, with the at least one processor, cause the apparatus to generate one or more record category vectors associated with the one or more record category identifiers, wherein, when generating a record category vector of the one or more record category vectors that is associated with a record category identifier of the one or more record category identifiers, the at least one non-transitory memory and the computer program code are configured to, with the at least one processor, cause the apparatus to:

identify at least one record text vector, from the one or more record text vectors, being associated with the record category identifier of the one or more record category identifiers; and generate the record category vector associated with the record category identifier based at least in part on the at least one record text vector and a third natural language processing model.

4. The apparatus of claim 3, wherein the at least one non-transitory memory and the computer program code are configured to, with the at least one processor, cause the apparatus to:

identify at least one record category identifier, from the one or more record category identifiers, being associated with an encounter identifier of the one or more encounter identifiers based at least in part on the one or more record data elements;

identify at least one record category vector, from the one or more record category vectors, being associated with the at least one record category identifier; and generate at least one encounter vector associated with the encounter identifier based at least in part on the at least one record category vector.

5. The apparatus of claim 4, wherein the at least one non-transitory memory and the computer program code are configured to, with the at least one processor, cause the apparatus to:

determine whether more than one record category vector is associated with the encounter identifier;

in response to determining that only one record category vector is associated with the at least one record category identifier, assign the only one record category vector as the at least one encounter vector; and in response to determining that only one record category vector is associated with the encounter identifier, assign the only one record category vector as the at least one encounter vector; and in response to determining that a plurality of record category vectors are associated with the at least one record category identifier, generate the at least one encounter vector based at least in part on the plurality of record category vectors.

6. The apparatus of claim 5, wherein, when generating the at least one encounter vector based at least in part on the plurality of record category vectors, the at least one non-transitory memory and the computer program code are configured to, with the at least one processor, cause the apparatus to combine the plurality of record category vectors based at least in part on one or more of summation, multiplication, or one or more artificial neural networks.

7. The apparatus of claim 3, wherein at least one of the first natural language processing model, the second natural language processing model, or the third natural language processing model is a transformer.

8. The apparatus of claim 7, wherein at least one of the first natural language processing model, the second natural language processing model, or the third natural language processing model is a Bi-directional Encoder Representations from Transformer (BERT).

9. The apparatus of claim 3, wherein, when generating the record category vector, the at least one non-transitory memory and the computer program code are configured to, with the at least one processor, cause the apparatus to:

select the third natural language processing model, from a plurality of natural language processing models, based at least in part on the record category identifier.

10. The apparatus of claim 2, wherein the one or more record category identifiers comprise at least one of: a diagnosis identifier, a procedure identifier, a pharmaceutical identifier, a lab test identifier, or a lab test result identifier.

11. The apparatus of claim 2, wherein, when associating the one or more record data elements with the one or more record text descriptors, the at least one non-transitory memory and the computer program code are configured to, with the at least one processor, cause the apparatus to:

query a network database based at least in part on the one or more record data elements.

12. The apparatus of claim 1, wherein, when generating the one or more encounter vectors, the at least one non-transitory memory and the computer program code are configured to, with the at least one processor, cause the apparatus to:

associate the one or more record data elements with one or more record text descriptors;

generate one or more record text vectors based at least in part on the one or more record text descriptors and a second natural language processing model; and generate the one or more encounter vectors based at least in part on the one or more record text vectors and a third natural language processing model.

13. The apparatus of claim 1, wherein, when generating the one or more encounter vectors, the at least one non-transitory memory and the computer program code are configured to, with the at least one processor, cause the apparatus to:

associate the one or more record data elements with one or more record category identifiers; and generate one or more record category vectors associated with the one or more record category identifiers based at least in part on the one or more record data elements.

14. The apparatus of claim 13, wherein, when generating a record category vector of the one or more record category vectors that is associated with a record category identifier of the one or more record category identifiers, the at least one non-transitory memory and the computer program code are configured to, with the at least one processor, cause the apparatus to:
  identify at least one record data element, from the one or more record data elements, being associated with the record category identifier of the one or more record category identifiers; and
  generate the record category vector associated with the record category identifier based at least in part on the at least one record data element and a second natural language processing model.

15. The apparatus of claim 13, wherein the at least one non-transitory memory and the computer program code are configured to, with the at least one processor, cause the apparatus to:
  identify at least one record category identifier, from the one or more record category identifiers, being associated with an encounter identifier of the one or more encounter identifiers based at least in part on the one or more record data elements;
  identify at least one record category vector, from the one or more record category vectors, being associated with the at least one record category identifier; and
  generate an encounter vector associated with the encounter identifier based at least in part on the at least one record category vector.

16. The apparatus of claim 15, wherein the at least one non-transitory memory and the computer program code are configured to, with the at least one processor, cause the apparatus to:
  determine whether more than one record category vector is associated with the encounter identifier;
  in response to determining that only one record category vector is associated with the encounter identifier, assign the only one record category vector as the encounter vector; and
  in response to determining that a plurality of record category vectors are associated with the at least one record category identifier, generate the encounter vector based at least in part on combining the plurality of record category vectors.

17. The apparatus of claim 1, wherein, when generating the client vector, the at least one non-transitory memory and the computer program code are configured to, with the at least one processor, cause the apparatus to:
  generate the client vector based at least in part on the one or more encounter identifiers and the one or more encounter vectors using the first natural language processing model.

18. The apparatus of claim 17, wherein the at least one non-transitory memory and the computer program code are configured to, with the at least one processor, cause the apparatus to:
  calculate one or more encounter date metadata based at least in part on the one or more encounter identifiers and a base date.

19. A computer-implemented method comprising:
  retrieving one or more record data elements associated with a client identifier, wherein each of the one or more record data elements is associated with an encounter identifier of one or more encounter identifiers, wherein the one or more encounter identifiers are associated with the client identifier;
  generating one or more encounter vectors based at least in part on the one or more record data elements, wherein the one or more encounter vectors are associated with the one or more encounter identifiers;
  generating a client vector based at least in part on the one or more encounter vectors, wherein the client vector is associated with the client identifier, wherein a first natural language processing model is associated with at least one of the one or more encounter vectors or the client vector;
  generating a prediction data element based at least in part on the client vector and a machine learning model, wherein the prediction data element is associated with the client identifier; and
  performing at least one data operation based at least in part on the prediction data element.

20. A computer program product comprising at least one non-transitory computer-readable storage medium having computer-readable program code portions stored therein, the computer-readable program code portions comprising an executable portion configured to:
  retrieve one or more record data elements associated with a client identifier, wherein each of the one or more record data elements is associated with an encounter identifier of one or more encounter identifiers, wherein the one or more encounter identifiers are associated with the client identifier;
  generate one or more encounter vectors based at least in part on the one or more record data elements, wherein the one or more encounter vectors are associated with the one or more encounter identifiers;
  generate a client vector based at least in part on the one or more encounter vectors, wherein the client vector is associated with the client identifier, wherein a first natural language processing model is associated with at least one of the one or more encounter vectors or the client vector;
  generate a prediction data element based at least in part on the client vector and a machine learning model, wherein the prediction data element is associated with the client identifier; and
  perform at least one data operation based at least in part on the prediction data element.

* * * * *